US011238846B2

(12) United States Patent
Ohmura et al.

(10) Patent No.: US 11,238,846 B2
(45) Date of Patent: Feb. 1, 2022

(54) INFORMATION PROCESSING DEVICE AND INFORMATION PROCESSING METHOD

(71) Applicant: Sony Corporation, Tokyo (JP)

(72) Inventors: Junki Ohmura, Tokyo (JP); Hiroaki Ogawa, Chiba (JP); Kana Nishikawa, Tokyo (JP); Keisuke Touyama, Tokyo (JP); Shinobu Kuriya, Kanagawa (JP); Yasushi Tsuruta, Tokyo (JP)

(73) Assignee: SONY CORPORATION, Tokyo (JP)

( * ) Notice: Subject to any disclaimer, the term of this patent is extended or adjusted under 35 U.S.C. 154(b) by 116 days.

(21) Appl. No.: 16/629,966

(22) PCT Filed: Apr. 17, 2018

(86) PCT No.: PCT/JP2018/015796
§ 371 (c)(1),
(2) Date: Jan. 10, 2020

(87) PCT Pub. No.: WO2019/017027
PCT Pub. Date: Jan. 24, 2019

(65) Prior Publication Data
US 2021/0151030 A1    May 20, 2021

(30) Foreign Application Priority Data
Jul. 19, 2017    (JP) .............................. JP2017-140069

(51) Int. Cl.
*G10L 15/01*    (2013.01)
*G10L 15/22*    (2006.01)
*G10L 25/63*    (2013.01)

(52) U.S. Cl.
CPC .............. *G10L 15/01* (2013.01); *G10L 15/22* (2013.01); *G10L 25/63* (2013.01); *G10L 2015/227* (2013.01)

(58) Field of Classification Search
CPC .......... G10L 15/01; G10L 15/22; G10L 25/63; G10L 2015/227

(Continued)

(56) References Cited

U.S. PATENT DOCUMENTS

| 2007/0274596 | A1* | 11/2007 | Murata | ................. G06F 16/784 |
| --- | --- | --- | --- | --- |
| | | | | 382/209 |
| 2010/0021142 | A1* | 1/2010 | Minami | ................. H04N 19/44 |
| | | | | 386/241 |
| 2016/0205427 | A1* | 7/2016 | Yoon | ..................... G06F 3/0482 |
| | | | | 725/34 |

FOREIGN PATENT DOCUMENTS

| JP | 5797820 B1 | 10/2015 |
| --- | --- | --- |
| JP | 2016-99967 A | 5/2016 |
| JP | 2016-99968 A | 5/2016 |

OTHER PUBLICATIONS

International Search Report and Written Opinion dated Jun. 12, 2018 for PCT/JP2018/015796 filed on Apr. 17, 2018, 9 pages including English Translation of the International Search Report.

* cited by examiner

*Primary Examiner* — Bharatkumar S Shah
(74) *Attorney, Agent, or Firm* — Xsensus, LLP

(57) ABSTRACT

[Problem] More effective information is gathered efficiently for the correction of device behavior.
[Solution] Provided is an information processing device that includes an output control unit that controls, on the basis of a gathered operation history of a device, an output of a reproduced scene pertaining to a behavior which the device has executed on the basis of context information; and a communication unit that receives feedback input by a judge regarding the reproduced scene thus output. Further provided is an information processing device that comprises a communication unit that receives information on a repro- (Continued)

duced scene pertaining to a behavior which the device has executed on the basis of context information; and a playback unit that plays back the reproduced scene, wherein the communication unit transmits feedback input by a judge regarding the reproduced scene.

19 Claims, 14 Drawing Sheets

(58) Field of Classification Search
USPC .......................................................... 704/231
See application file for complete search history.

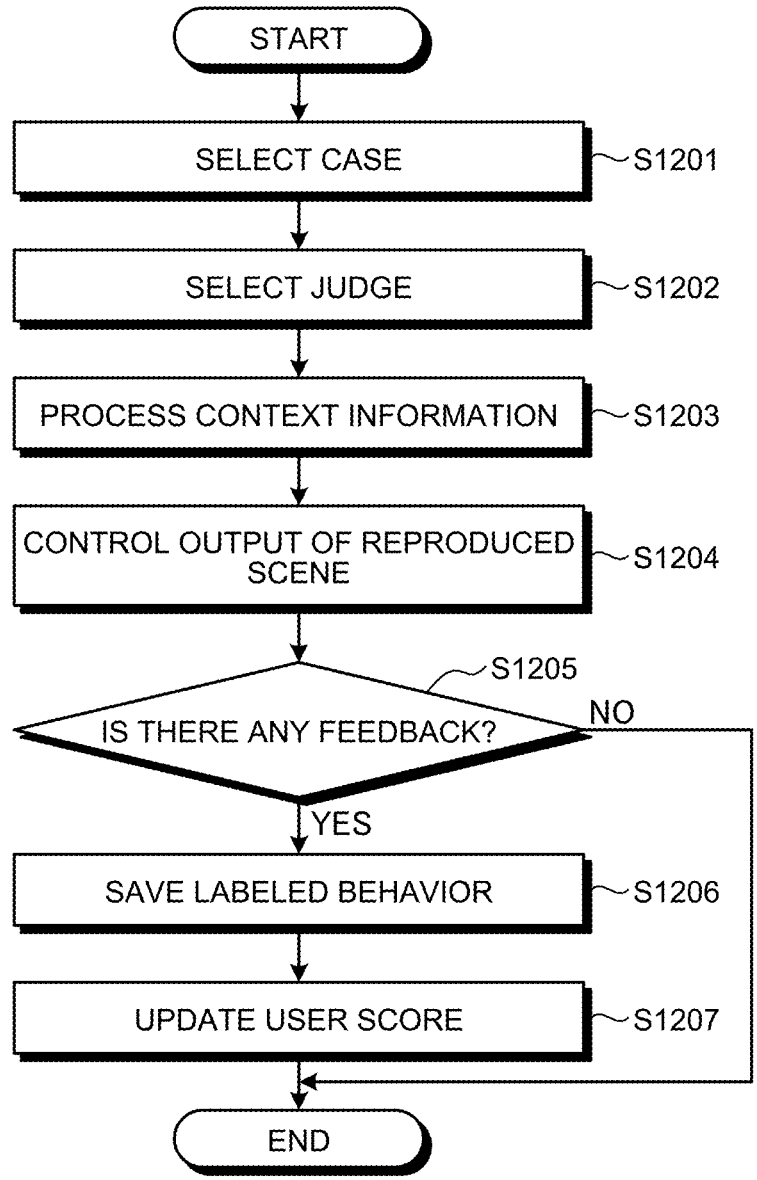

INFORMATION PROCESSING DEVICE AND INFORMATION PROCESSING METHOD

CROSS-REFERENCE TO RELATED APPLICATIONS

The present application is based on PCT filing PCT/JP2018/015796, filed Apr. 17, 2018, which claims priority to JP 2017-140069, filed Jul. 19, 2017, the entire contents of each are incorporated herein by reference.

FIELD

The present invention relates to an information processing device and an information processing method.

BACKGROUND

Recent years have witnessed a popularization of devices which make determinations based on statuses and conditions and which determine their own behavior. Such devices include, for example, interactive devices that respond to inquiries from a user and autonomous devices such as self-driving cars which perform operations according to environmental states. Furthermore, technologies for evaluating the validity of behaviors executed by such devices are under development. For example, Patent Literature 1 discloses an interactive device that evaluates the validity of a response to a speech input by a user.

CITATION LIST

Patent Literature

Patent Literature 1: JP 2015-4754 A

SUMMARY

Technical Problem

However, the technology disclosed in Patent Literature 1 is limited to evaluating the validity of responses on the basis of affirmative expressions and negative expressions which are included in user utterances. For this reason, where the interactive device disclosed in Patent Literature 1 is concerned, even when a correct response or a more suitable response exists, it is difficult to specify this response in particular.

Therefore, the present invention proposes a novel and improved information processing device and information processing method which make it possible to efficiently gather more effective information for the correction of device behavior.

Solution to Problem

1. According to the present disclosure, an information processing device is provided that includes: an output control unit that controls, on the basis of a gathered operation history of a device, an output of a reproduced scene pertaining to a behavior which the device has executed on the basis of context information; and a communication unit that receives feedback input by a judge regarding the reproduced scene thus output.

Moreover, according to the present disclosure, an information processing device, comprising: a communication unit that receives information on a reproduced scene pertaining to a behavior which the device has executed on the basis of context information; and a playback unit that plays back the reproduced scene, wherein the communication unit transmits feedback input by a judge regarding the reproduced scene.

Moreover, according to the present disclosure, an information processing method executed by a processor is provided that includes: controlling, on the basis of a gathered operation history of a device, an output of a reproduced scene pertaining to a behavior which the device has executed on the basis of context information; and receiving feedback input by a judge regarding the reproduced scene thus output.

Moreover, according to the present disclosure, an information processing method executed by a processor is provided that includes: receiving information on a reproduced scene pertaining to a behavior which a device has executed on the basis of context information; playing back the reproduced scene; and transmitting feedback input by a judge regarding the reproduced scene.

Advantageous Effects of Invention

According to the present invention as described hereinabove, it is possible to efficiently gather more effective information for the correction of device behavior.

Note that the foregoing advantageous effects are not necessarily limited, rather, any advantageous effects disclosed in the present specification or other advantageous effects which can be ascertained from the present specification may be included in addition to the foregoing advantageous effects or instead of the foregoing advantageous effects.

BRIEF DESCRIPTION OF DRAWINGS

FIG. 11 is a flowchart illustrating the flow of reproduced scene output control and feedback gathering by the information processing server according to the same embodiment.

DESCRIPTION OF EMBODIMENTS

Figure 1:
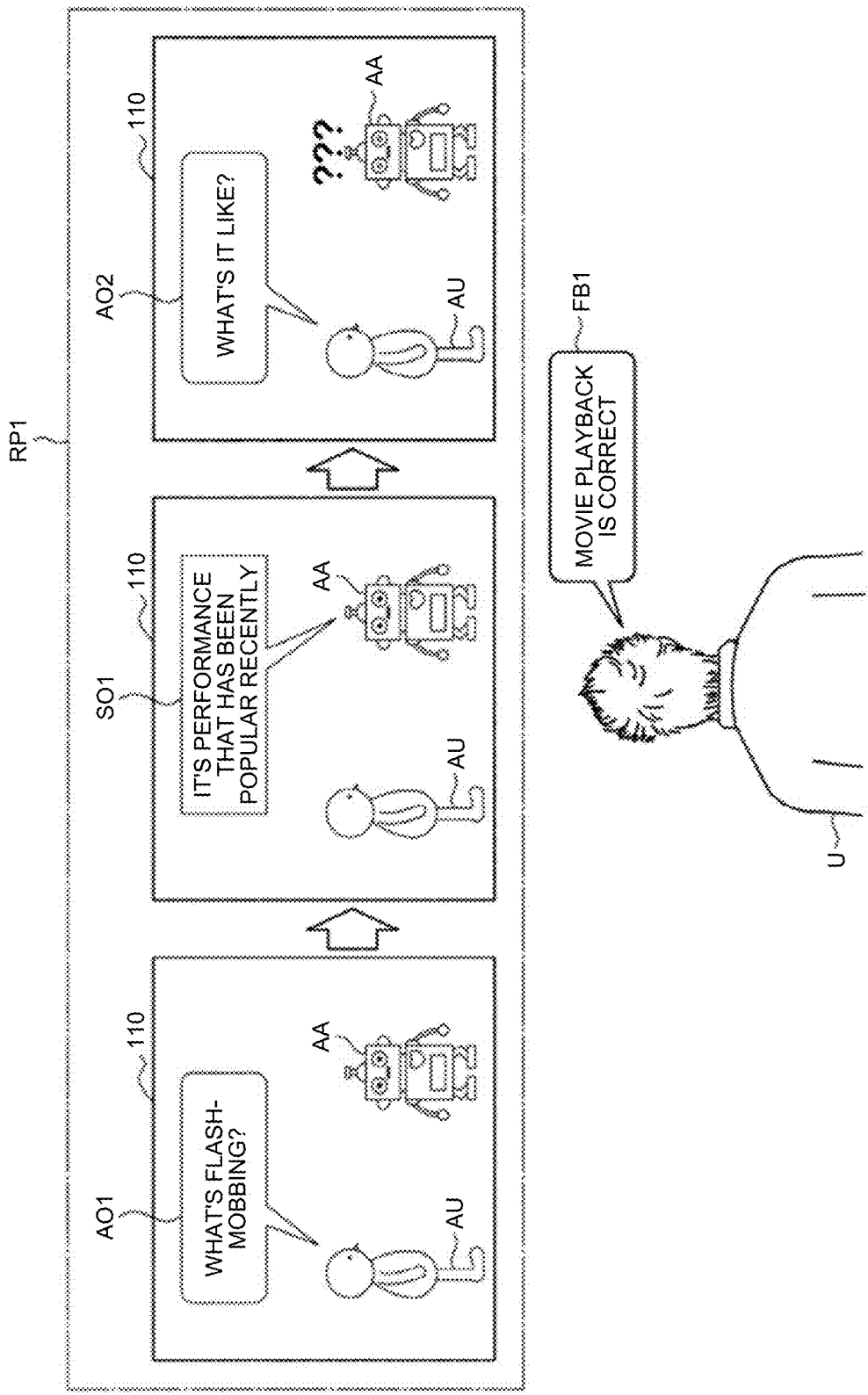
FIG. 1 is a diagram serving to illustrate an overview of reproduced scene outputs and feedback inputs by a judge, according to a first embodiment of the present invention.

Preferred embodiments of the present invention will be explained in detail hereinbelow with reference to the accompanying drawings. Note that repetitive descriptions are omitted from the present specification and drawings by assigning the same reference signs to constituent elements which have substantially the same function configurations.

Note that the description will be provided in the following order.

1. Overview
2. First Embodiment
 2.1. Overview
 2.2. System configuration example
 2.3. Function configuration example of information processing terminal 10
 2.4. Function configuration example of information processing server 20
 2.5. Case gathering
 2.6. Reproduced scene output control
 2.7. Judge selection
 2.8. Process flow
3. Second Embodiment
4. Third Embodiment
5. Hardware configuration example
6. Conclusion 1. Overview As mentioned earlier, recent years have witnessed the popularization of devices which make determinations based on statuses and conditions and which determine their own behavior. Such devices are able to make determinations on the basis of inputs by a user, user actions and states, or the peripheral environment, or the like, for example, and are able to provide the user with certain actions.

However, the behaviors executed by a device are not always limited to correct behaviors, rather, situations sometimes arise where the device ends up executing a behavior that differs from the behavior expected by the user. In order to prevent such a situation and improve the accuracy of behavior by the device, there is a need to gather and analyze cases where the device has executed low validity behaviors and to correct an algorithm linking determinations and control so that the device is capable of executing correct behaviors.

However, even if the device has executed a behavior not meeting user expectations, the user seldom provides the developer of the device with information, and gathering enough cases to improve the device is problematic at the present time.

Moreover, even when enough cases have been gathered, huge amounts of time and personnel costs are required in order for the developer to analyze every single case and to provide data, that is, correct answer labels, indicating correct device behaviors.

The technical ideas according to the present invention were conceived in view of the foregoing points and make it possible to efficiently gather more effective information for the correction of device behavior. To this end, one feature of an information processing method according to one embodiment of the present invention is that a reproduced scene pertaining to gathered cases is presented to a judge and that the judge viewing the reproduced scene is made to input feedback pertaining to device behavior.

System configurations and functions for realizing the foregoing feature will be described in detail hereinbelow. Note that the technical ideas pertaining to the present invention are not limited to examples cited in the embodiments described hereinbelow, rather, the technical ideas can be widely applied to a variety of devices that determine their own behavior.

2. First Embodiment

<<2.1. Overview>>

A first embodiment of the present invention will be described first. In the first embodiment of the present invention, a case where an information processing server 20 gathers feedback regarding behavior executed by an information processing terminal 10 that performs interactions with a user is described by way of example. The information processing terminal 10 according to the present embodiment may be a speech interaction device that realizes interactions with a user by means of speech, for example.

First, an overview of reproduced scene outputs and feedback inputs by a judge according to the present embodiment will be described. The information processing server 20 according to the present embodiment has a function for controlling, on the basis of a gathered operation history of a device, an output of a scene pertaining to a behavior which the device has executed on the basis of context information. More specifically, the information processing server 20 according to the present embodiment may generate a reproduced scene pertaining to a gathered operation history, that is, pertaining to cases, and may cause the information processing terminal 10 used by the judge play back the playback scene.

In addition, the information processing server 20 according to the present embodiment has a function for receiving feedback which is input by the judge regarding the reproduced scene that has been played back by the information processing terminal 10. Here, the feedback indicates information relating to correct behavior which is to be executed by the information processing terminal 10. That is, the information processing server 20 according to the present embodiment is capable of making the judge viewing the reproduced scene determine which behavior should be executed by the information processing terminal 10 and of obtaining the response.

Figure 2:
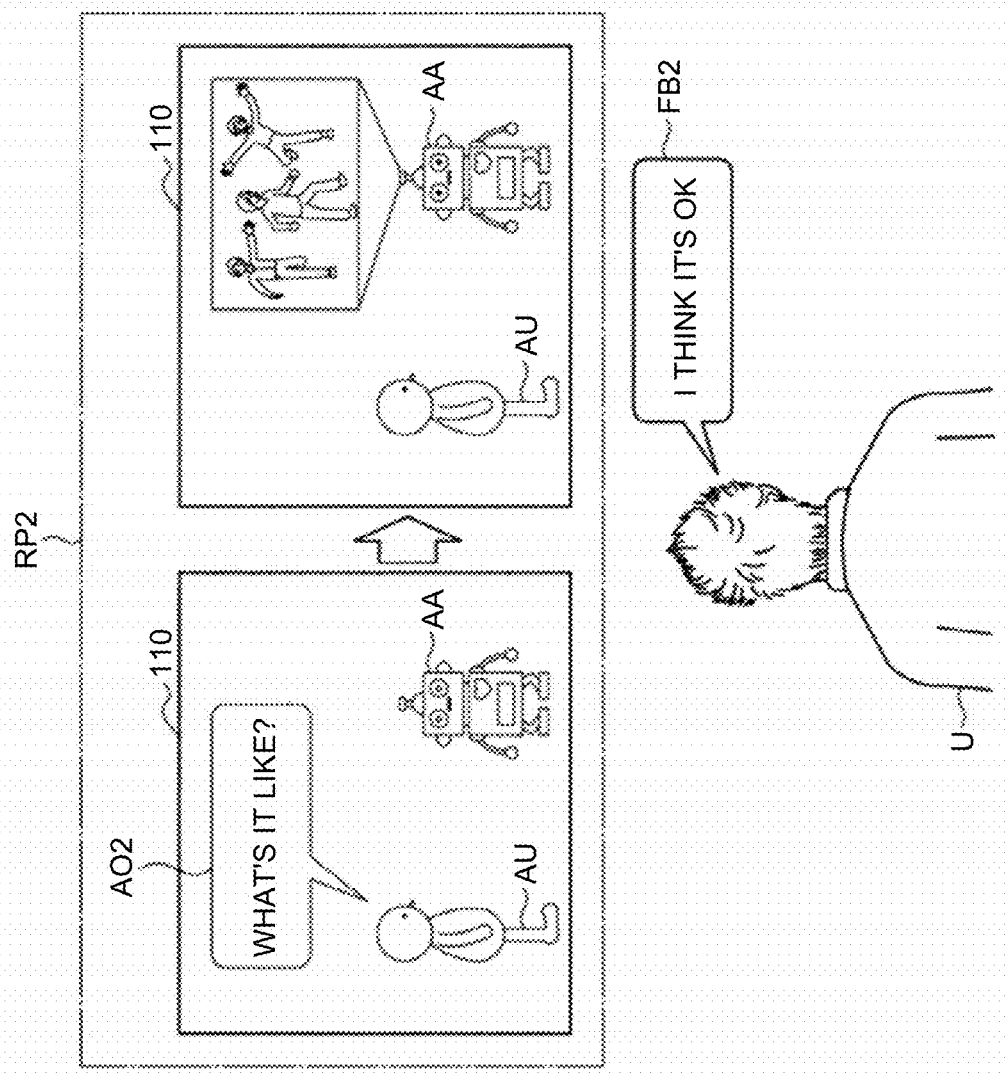
FIG. 2 is a diagram serving to illustrate an overview of reproduced scene outputs and feedback inputs by a judge, according to the same embodiment.

FIGS. 1 and 2 are diagrams serving to illustrate an overview of reproduced scene outputs and feedback inputs by a judge, according to the present embodiment. FIG. 1 illustrates a reproduced scene RP1 which has been generated by the information processing server 20 on the basis of a history relating to behavior of the information processing terminal 10 which has been determined as low validity behavior.

The information processing server 20 causes a display unit 110 of the information processing terminal 10 used by the judge to display the reproduced scene RP1. At such time, one feature of the information processing server 20 is that of reflecting context information pertaining to the behavior executed by the information processing terminal 10 in the reproduced scene RP1. The context information is various information used by the information processing terminal 10 in executing behaviors. In the case of the reproduced scene RP1 illustrated in FIG. 1, the information processing server 20 reproduces speech utterances of the information processing terminal 10 and utterances of the user of the information processing terminal 10 by means of a device avatar AA and a user avatar AU, respectively.

In the example illustrated in FIG. 1, a case is reproduced, by means of the device avatar AA and user avatar AU, where, after the information processing terminal 10 has issued a response by means of a speech utterance SO1 to an inquiry made via a user utterance AO1, the information processing terminal 10 has not been able to execute an appropriate behavior in response to a further inquiry via an utterance AO2 from the user.

At such time, a judge U who has viewed the reproduced scene RP1 inputs, to the information processing terminal 10, feedback relating to the correct behavior which should have been executed by the information processing terminal 10. In the case of the example illustrated in FIG. 1, the judge U issues feedback FB1 via an utterance. The information processing terminal 10 transmits the feedback that has been input by judge U to the information processing server 20.

Furthermore, FIG. 2 illustrates a reproduced scene RP2 which the information processing server 20 has generated on the basis of a history relating to behavior which the information processing terminal 10 has executed with low reliability. For example, the information processing terminal 10 of a speech interaction device or the like performs an output of a speech utterance serving as a response, or starts an application, or the like, on the basis of a user utterance, but, in so doing, the information processing terminal 10 may execute the behavior even when the reliability with which the executed behavior will be correct is low.

For the reproduced scene RP2 illustrated in FIG. 2, a case where the information processing terminal 10 has executed moving image playback in response to the user utterance AO2 is reproduced by using the user avatar AU and device avatar AA. In this case, the information processing terminal 10 performs moving image playback in a state where correct behavior in response to the user utterance AO2 is uncertain, that is, with low reliability.

At such time, judge U, who has viewed the reproduced scene RP2, determines whether or not the moving image playback which the information processing terminal 10 has executed with low reliability is actually correct and inputs feedback. In the example illustrated in FIG. 2, judge U issues feedback FB2 via an utterance.

Thus, the information processing server 20 according to the present embodiment is capable of generating a reproduced scene pertaining to various cases and of asking the user for feedback. Note that such cases are not limited to cases pertaining to the aforementioned low validity or low reliability behavior. In order to realize more appropriate behavior even when the validity of the behavior is actually high, the information processing server 20 according to the present embodiment is capable of generating a reproduced scene pertaining to the behavior and asking the user for feedback.

In addition, in the present embodiment, validity is determined on the basis of utterances, responses, context, and environment, and so forth, for example. The validity of utterances is determined, for example, on the basis of syntactical errors, errors of meaning, inappropriate utterances not functioning as utterances, and the like. Furthermore, the validity of responses is determined, for example, on the basis of an information excess or deficiency, inconsistency with a previous utterance, a non-paired response, intentional ambiguity, and errors of interpretation, and so forth. In addition, the validity of context is determined, for example, on the basis of repetition, inconsistency with context, a contextual leap, content ambiguity, a disregard for development, or the like. Further, the validity of environment is determined, for example, on the basis of an assertion of unacceptability, inconsistency with common sense, an utterance not falling within social norms, or the like.

As described hereinabove, the information processing server 20 according to the present embodiment is capable of generating various reproduced scenes pertaining to behavior executed by the information processing terminal 10 and of presenting same to a judge. Furthermore, the information processing server 20 according to the present embodiment is capable of gathering feedback pertaining to behaviors from the judge who has viewed the reproduced scenes. By means of the foregoing functions of the information processing server 20 according to the present embodiment, it is possible to efficiently gather feedback in order to generate correct answer labels pertaining to behaviors of the information processing terminal 10, and greatly reduce costs.

<<2.2. System Configuration Example>>

Figure 3:
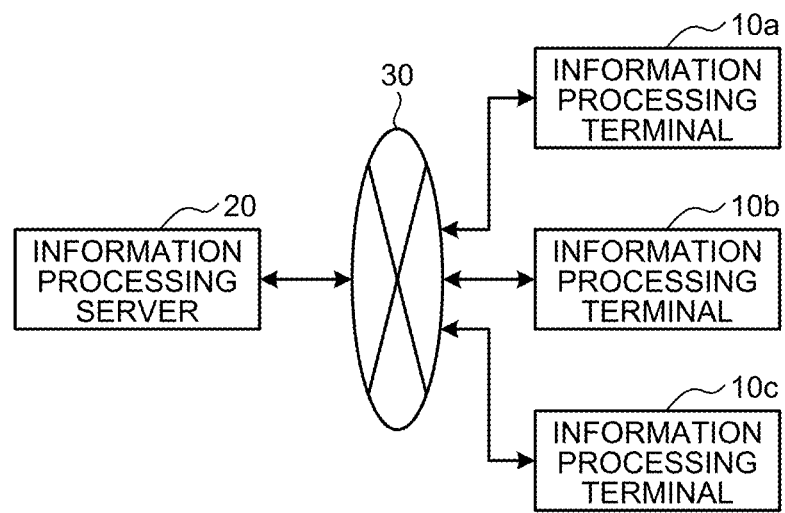
FIG. 3 is a block diagram illustrating a system configuration example of an information processing system according to the same embodiment.

First, the system configuration example of the information processing system according to the present embodiment will be described. FIG. 3 is a block diagram illustrating a system configuration example of an information processing system according to the present embodiment. Referring to FIG. 3, the information processing system according to the present embodiment comprises a plurality of information processing terminals 10 and an information processing server 20. In addition, the information processing terminals 10 and the information processing server 20 are connected via a network 30 in order to be able to communicate with one other.

(Information Processing Terminal 10)

The information processing terminal 10 according to the present embodiment is an information processing device which executes certain behaviors on the basis of context information. In the case of the present embodiment, the information processing terminal 10 may be a speech interaction device that performs speech interactions with a user on the basis of context information such as user utterances, actions and states, or the peripheral environment.

In addition, the information processing terminal 10 according to the present embodiment has a function for presenting reproduced scenes to the judge on the basis of control by the information processing server 20. Further, the information processing terminal 10 according to the present embodiment transmits feedback that has been input by the judge to the information processing server 20.

The information processing terminal 10 according to the present embodiment may, for example, be a portable telephone, a smartphone, a tablet, a wearable device, a general-purpose computer, a dedicated device of a stationary type or autonomous mobile type, or the like.

Note that the information processing terminal 10 according to the present embodiment need not necessarily comprise both a speech interaction function and a function pertaining to reproduced scene output and feedback gathering. Different information processing terminals 10 may be responsible for the two foregoing functions, respectively.

(Information Processing Server 20)

The information processing server 20 according to the present embodiment is an information processing device which generates reproduced scenes on the basis of gathered cases and which causes the information processing terminals 10 to output the reproduced scenes. At such time, one feature of the information processing server 20 according to the present embodiment is generating reproduced scenes which reflect context information which the information processing terminals 10 have used in executing behaviors.

Moreover, the information processing server 20 according to the present embodiment has a function for receiving feedback which is input by the judge viewing the reproduced scenes from the information processing terminal 10 and for saving, together with cases and on the basis of the feedback, correct answer labels pertaining to the behaviors of the information processing terminal 10.

(Network 30)

The network 30 has a function for connecting the information processing terminals 10 and information processing server 20. The network 30 may also include a public line such as the internet, a telephone network, or a satellite communication network, and various local area networks (LANs) including Ethernet (registered trademark) and wide area networks (WANs), or the like. Furthermore, the network 30 may also include a dedicated line such as an internet protocol-virtual private network (IP-VPN). In addition, the network 30 may also include a wireless communication network such as Wi-Fi (registered trademark) or Bluetooth (registered trademark).

A system configuration example of the information processing system according to the present embodiment has been described hereinabove. Note that the foregoing configuration described using FIG. 3 is merely an example, and that the configuration of the information processing system according to the present embodiment is not limited to such an example. For example, the functions of the information processing terminals 10 and information processing server 20 according to the present embodiment may also be realized by means of a single device. Furthermore, FIG. 3 illustrates, by way of an example, a case where the information processing server 20 is connected to three information processing terminals 10a to 10c, but the number of information processing terminals 10 according to the present embodiment is not limited to or by such an example. The configuration of the information processing system according to the present embodiment can be flexibly modified according to the specifications and application.

<<2.3. Function Configuration Example of Information Processing Terminal 10>>

Figure 4:
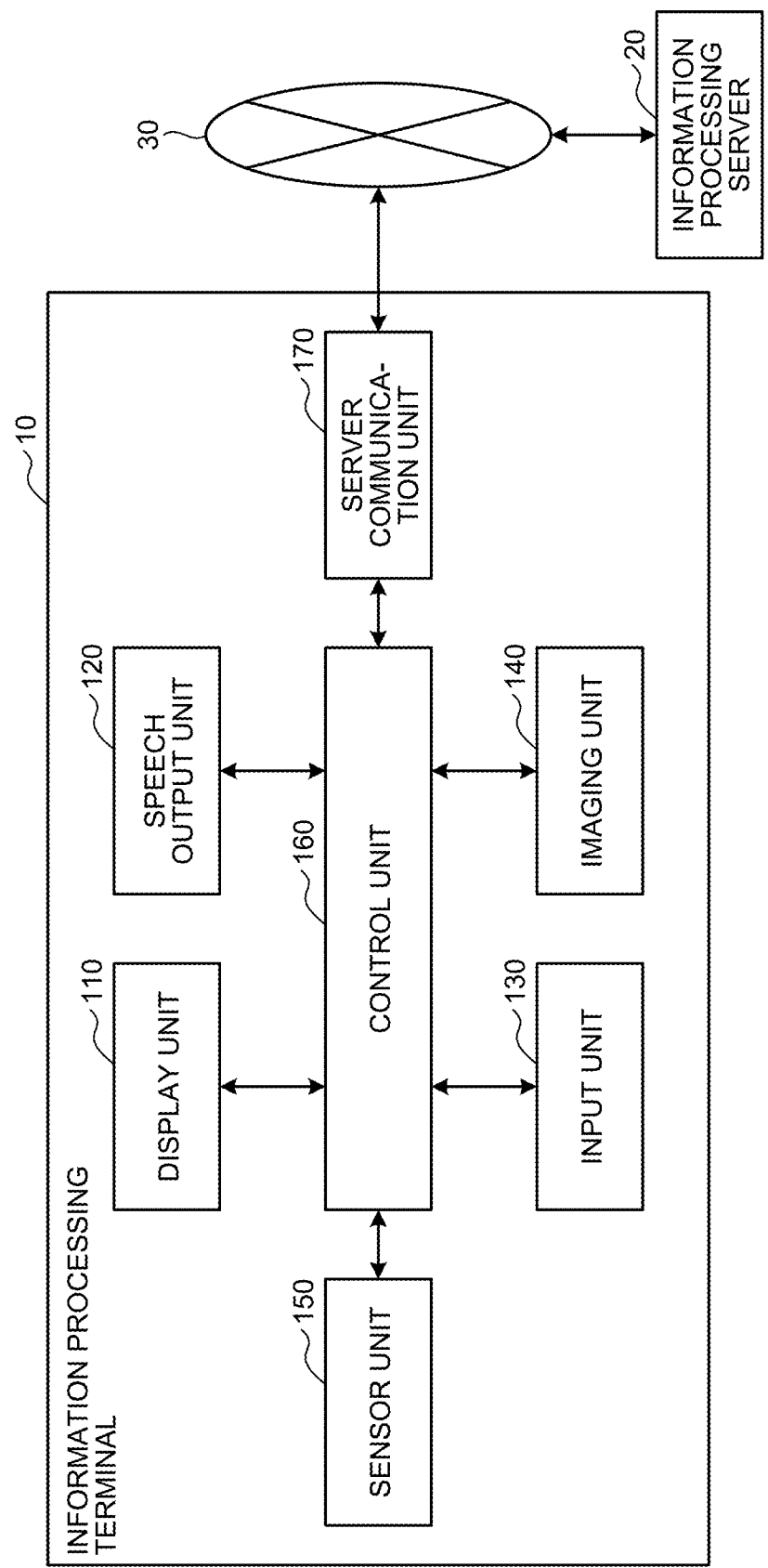
FIG. 4 is a block diagram illustrating a function configuration example of an information processing terminal according to the same embodiment.

A function configuration example of the information processing terminal 10 according to the present embodiment will be described next. FIG. 4 is a block diagram illustrating a function configuration example of the information processing terminal 10 according to the present embodiment. Referring to FIG. 4, the information processing terminal 10 according to the present embodiment comprises a display unit 110, a speech output unit 120, an input unit 130, an imaging unit 140, a sensor unit 150, a control unit 160, and a server communication unit 170.

(Display Unit 110)

The display unit 110 according to the present embodiment has a function for outputting visual information such as images and text. The display unit 110 according to the present embodiment is capable of outputting visual information pertaining to reproduced scenes of behaviors on the basis of control by means of the information processing server 20.

Hence, the display unit 110 according to the present embodiment comprises a display device that displays visual information, or the like. Examples of the foregoing display device include liquid crystal display (LCD) devices, organic light emitting diode (OLED) devices, and touch panels, and the like.

(Speech Output Unit 120)

The speech output unit 120 according to the present embodiment has a function for outputting sound information including speech utterances and the like. The speech output unit 120 according to the present embodiment outputs sound information pertaining to reproduced scenes on the basis of control by the information processing server 20, for example. For this purpose, the speech output unit 120 according to the present embodiment comprises a speech output device such as a loudspeaker or amplifier.

(Input Unit 130)

The input unit 130 according to the present embodiment has a function for detecting various inputs by the user. The input unit 130 detects user inquiries and feedback made by means of utterances or an input device, for example. Hence, the input unit 130 according to the present embodiment comprises a variety of input devices such as a microphone for gathering sound information, a keyboard, a touch panel, and buttons.

(Imaging Unit 140)

The imaging unit 140 according to the present embodiment has a function for capturing images including users and the peripheral environment. The images captured by the imaging unit 140 are used in user recognition and the recognition of user states and the peripheral environment, and so forth, by the information processing server 20. The imaging unit 140 according to the present embodiment comprises an imaging device capable of capturing images. Note that the foregoing images include moving images as well as still images.

(Sensor Unit 150)

The sensor unit 150 according to the present embodiment has a function for gathering various sensor information relating to the peripheral environment and to user actions and states. The sensor information gathered by the sensor unit 150 is used in recognition of the peripheral environment, user action recognition, and state recognition, by the information processing server 20. The sensor unit 150 comprises, for example, an optical sensor including an illumination sensor, an acceleration sensor, a gyro sensor, a terrestrial magnetism sensor, a heat sensor, a vibration sensor, or a global navigation satellite system (GNSS) signal receiver, or the like.

(Control Unit 160)

The control unit 160 according to the present embodiment has a function for controlling each configuration of the information processing terminal 10. The control unit 160 controls startup and stoppage of each configuration, for example. Furthermore, the control unit 160 is capable of inputting a control signal which is generated by the information processing server 20 to the display unit 110 and speech output unit 120.

(Server Communication Unit 170)

The server communication unit 170 according to the present embodiment has a function for communicating information with the information processing server 20 via the network 30. More specifically, the server communication unit 170 transmits input information gathered by the input unit 130, image information captured by the imaging unit 140, and sensor information gathered by the sensor unit 150 to the information processing server 20. Furthermore, the server communication unit 170 receives information pertaining to reproduced scenes from the information processing server 20.

A function configuration example of the information processing terminal 10 according to the present embodiment has been described hereinabove. Note that the foregoing configuration described using FIG. 4 is merely an example, and that the function configuration of the information processing terminal 10 according to the present embodiment is not limited to or by such an example. For example, the information processing terminal 10 according to the present embodiment need not necessarily comprise all the configurations illustrated in FIG. 4. The information processing terminal 10 may also be configured to not include the speech output unit 120, imaging unit 140, and sensor unit 150, and the like. The function configuration of the information processing terminal 10 according to the present embodiment can be flexibly modified according to the specifications and application.

<<2.4. Function Configuration Example of Information Processing Server 20>>

Figure 5:
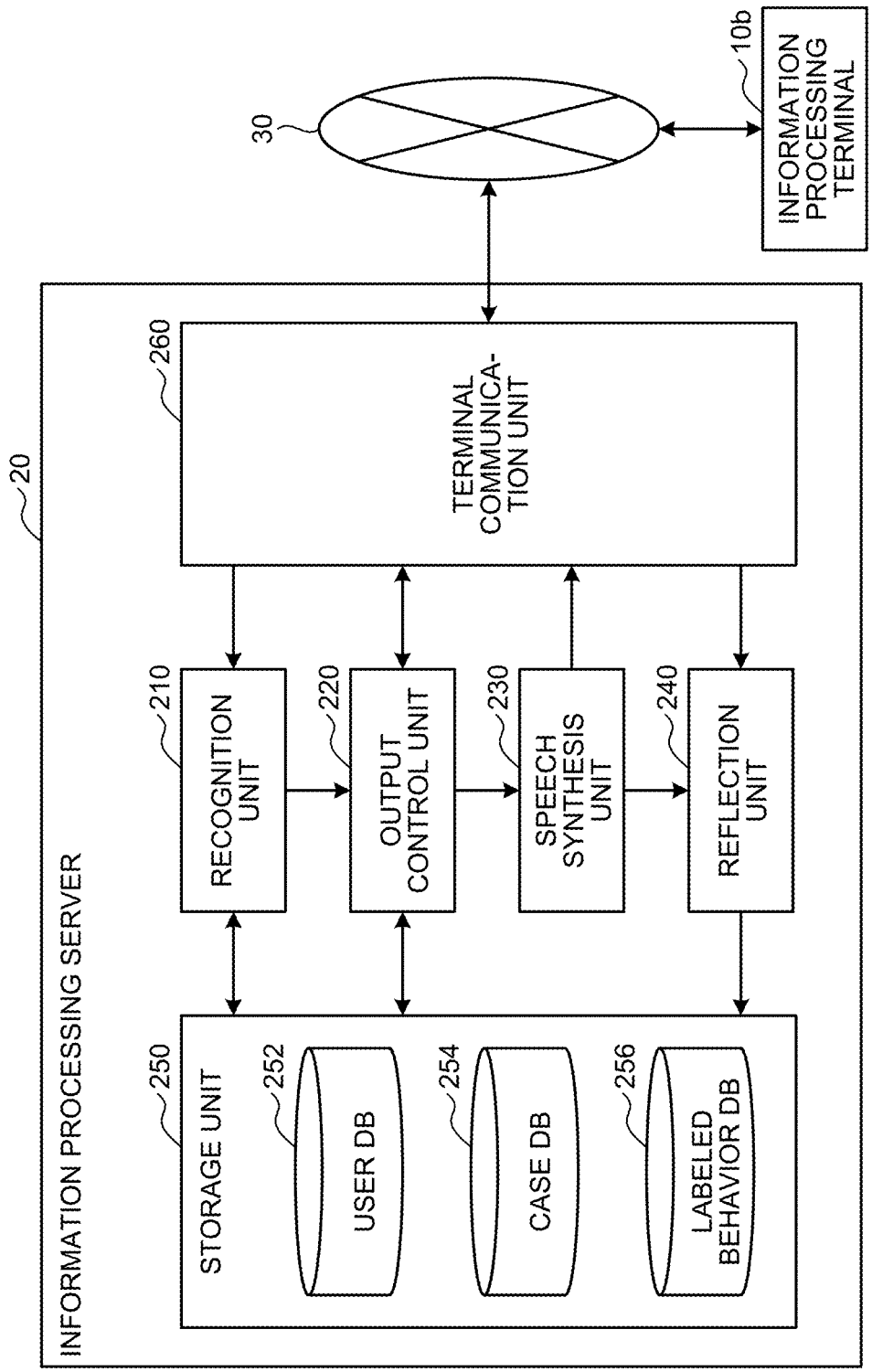
FIG. 5 is a block diagram illustrating a function configuration example of an information processing server according to the same embodiment.

A function configuration example of the information processing server 20 according to the present embodiment will be described next. FIG. 5 is a block diagram illustrating a function configuration example of the information processing server 20 according to the present embodiment. Referring to FIG. 5, the information processing server 20 according to the present embodiment comprises a recognition unit 210, an output control unit 220, a speech synthesis unit 230, a reflection unit 240, a storage unit 250, and a terminal communication unit 260. In addition, the storage unit 250 comprises a user DB 252, a case DB 254, and a labeled behavior DB 256.

(Recognition Unit 210)

The recognition unit 210 according to the present embodiment has a function for performing various recognition on the basis of the information gathered by the information processing terminal 10. The recognition unit 210 executes speech recognition on the basis of user utterances gathered by the information processing terminal 10, for example.

Furthermore, the recognition unit 210 according to the present embodiment recognizes user actions and states and the peripheral environment, and so forth, on the basis of sound information, image information, sensor information, and the like, gathered by the information processing terminal 10. The results of recognition by the recognition unit 210 according to the present embodiment are used as context information.

(Output Control Unit 220)

The output control unit 220 according to the present embodiment has a function for generating a reproduced scene and controlling the output of the playback scene on the basis of an operation history of the information processing terminal 10. At such time, the output control unit 220 according to the present embodiment generates a reproduced scene which reflects context information which has been used in a determination when a behavior is executed. The output control unit 220 is capable of generating and causing the information processing terminal 10 to output a reproduced scene including visual information and auditory information, for example.

The context information includes information relating to user context, for example. User context according to the present embodiment includes actions by a user including utterances and input actions, and states and attributes, and the like. The output control unit 220 according to the present embodiment is capable of generating reproduced scenes obtained by reproducing user context.

In addition, the foregoing context information includes various environment states. The context information according to the present embodiment may include, for example, time, atmospheric temperature, weather, noise level, and states of other people and objects in the vicinity, and so forth.

Furthermore, the output control unit 220 according to the present embodiment may have a function for controlling the behavior of the information processing terminal 10 on the basis of context information. The output control unit 220 causes the information processing terminal 10 to execute a speech response to a user or execute the startup of various applications, on the basis of the results of speech recognition by the recognition unit 210, or the like, for example.

In addition, the output control unit 220 according to the present embodiment has a function for detecting low validity behavior and behavior that has been executed with low reliability, and saving these behaviors as cases. The output control unit 220 is capable of determining the validity of the behaviors on the basis of a user response to the behaviors the information processing terminal 10 has been made to execute and of storing behaviors and context information in association with each other in the case DB 254, for example. In addition, the output control unit 220 causes the case DB 254 to store the behaviors and context information in association with each other also similarly to when the reliability of behavior the information processing terminal 10 is made to execute is low.

(Speech Synthesis Unit 230)

The speech synthesis unit 230 according to the present embodiment has a function for synthesizing human speech which is output by means of the information processing terminal 10 on the basis of control by means of the output control unit 220.

(Reflection Unit 240)

The reflection unit 240 according to the present embodiment has a function for generating correct answer labels on the basis of the feedback from a judge which has been gathered by the information processing terminal 10, and storing the behaviors, which are the targets of the correct answer labels, and context information in the labeled behavior DB 256 in association with each other. The reflection unit 240 according to the present embodiment may also generate correct answer labels on the basis of the results of natural language processing of the feedback, for example. In addition, if feedback is transmitted by means of a selection method, or the like, for example, the reflection unit 240 may store, as is in the behavior DB 256 in association with behaviors, correct answer labels which have been selected in judge selection.

(Storage Unit 250)

The storage unit 250 according to the present embodiment comprises the user DB 252, the case DB 254, and the labeled behavior DB 256.

((User DB 252))

The user DB 252 according to the present embodiment stores various information relating to users. Here, the users include users using the information processing terminal 10 and the judge inputting feedback regarding reproduced scenes. The user DB 252 may also store information such as the gender, age, cultural background, preferences, trends, and so forth, of users, for example.

((Case DB 254))

The case DB 254 according to the present embodiment stores cases pertaining to low validity behaviors and behaviors that have been executed with low reliability. The case DB 254 according to the present embodiment stores the foregoing behaviors and context information which is used to determine the execution of those behaviors in association with each other. Note that the cases stored in the case DB 254 may be cases which are detected by means of the output control unit 220 or cases which are gathered on the basis of explicit inputs by the user. In addition, the case DB 254 may store cases that have been discovered on the basis of analysis by a developer.

(Terminal Communication Unit 260)

The terminal communication unit 260 according to the present embodiment has a function for communicating information with the information processing terminal 10 via the network 30. More specifically, the terminal communication unit 260 receives, from the information processing terminal 10, sound information such as utterances, input information, image information, sensor information, and feedback regarding reproduced scenes. In addition, the terminal communication unit 260 transmits reproduced scenes and control signals which have been generated by the output control unit 220 and human speech obtained through synthesis by the speech synthesis unit 230, and the like, to the information processing terminal 10.

A function configuration example of the information processing server 20 according to the present embodiment has been described hereinabove. Note that the foregoing function configuration described using FIG. 5 is merely an example, and that the function configuration of the information processing server 20 according to the present embodiment is not limited to or by such an example. For example, the information processing server 20 need not necessarily comprise all the configurations illustrated in FIG. 5. The recognition unit 210, speech synthesis unit 230, and storage unit 250 may also be provided in another device different from the information processing server 20. The function configuration of the information processing server 20 according to the present embodiment can be flexibly modified according to the specifications and application.

<<2.5. Case Gathering>>

The case gathering according to the present embodiment will be described next. As mentioned earlier, the information processing server 20 according to the present embodiment is capable of storing various cases pertaining to behaviors executed by the information processing terminal 10 and generating reproduced scenes pertaining to such cases.

Figure 6:
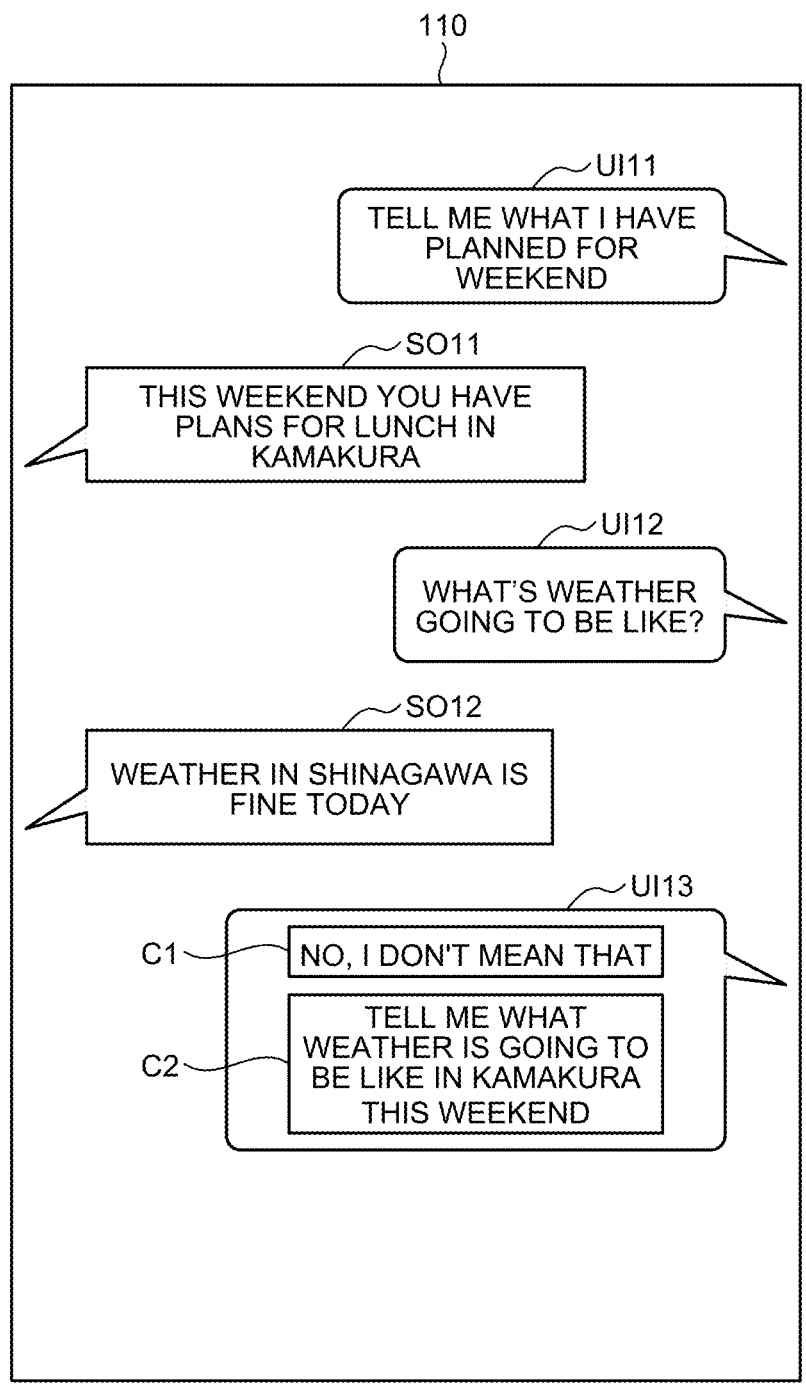
FIG. 6 is a diagram serving to illustrate case gathering on the basis of a validity determination by an output control unit according to the same embodiment.

At such time, the output control unit 220 according to the present embodiment may, for example, determine the validity of the behavior of the information processing terminal 10 on the basis of utterances, texts input by the user, and the like, and perform case gathering. FIG. 6 is a diagram serving to illustrate case gathering on the basis of a determination of validity by the output control unit 220. FIG. 6 illustrates, by means of inputs UI11 to UI13 by the user and outputs SO11 to SO12 by the information processing terminal 10, the flow of an interaction between the user and information processing terminal 10.

In an example illustrated in FIG. 6, the information processing terminal 10 first generates output SO11, which relates to lunch plans in Kamakura, in response to input UI11 by the user to inquire about plans for the weekend.

Input UI12 to ask about the weather is then made by the user. However, the information processing terminal 10 supplements place and time information that was missing from input UI12 on the basis of a default setting, and makes an output SO12 relating to today's weather in the user's current location.

However, if we refer to input UI13, the user knows, from the flow of the interaction pertaining to input UI11 and output SO12, that their intention was to ask about the weekend weather in Kamakura. Thus, a situation, where chronological information such as content spoken in the past serves as context, often occurs in the interaction.

At such time, the output control unit 220 according to the present embodiment is capable of determining that the validity of the output SO12 by the information processing terminal 10 is low on the basis of a negative expression C1 contained in input UI13 from the user and a repeat question C2 with additional detailed information such as a place and time. Here, the output control unit 220 is capable of causing the case DB 254 to record output SO12, and inputs UI11 and UI12 and output SO11, which are chronological information, in association with one another.

Figure 7:
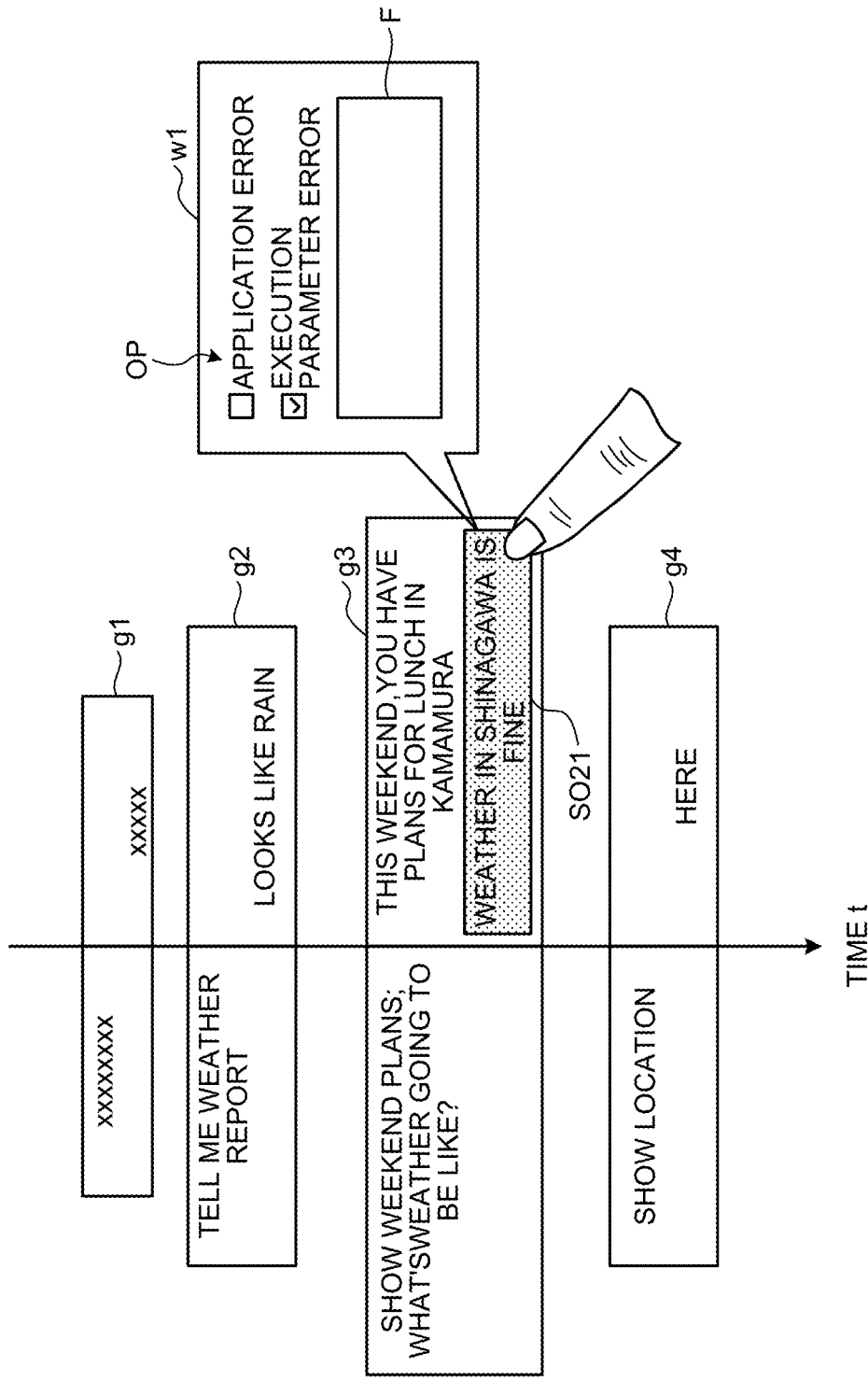
FIG. 7 is a diagram serving to illustrate case gathering on the basis of explicit inputs by a user according to the same embodiment.

Cases according to the present embodiment may also be gathered on the basis of explicit inputs by the user. FIG. 7 is a diagram serving to illustrate case gathering on the basis of explicit inputs by the user according to the present embodiment.

FIG. 7 illustrates an example of a user interface for referring to a history of interactions between the user and information processing terminal 10. Note that, in the example illustrated in FIG. 7, the interactions between the user and information processing terminal 10 are sorted in chronological order and grouped into groups g1 to g4 on the basis of factors such as content (topics, tasks) and times. Settings pertaining to this grouping may be freely configured by the user.

Furthermore, the user is able to select the groups g1 to g4 and a desired output within a group by swiping or tapping, for example. In the example illustrated in FIG. 7, the user selects output SO21, for which chronological context information has not been considered, and makes an explicit input identifying this behavior as low validity behavior in a window w1 which is being displayed.

At such time, the output control unit 220 is capable of encouraging the user to input more detailed information by displaying options OP pertaining to behavioral errors and a free input field F in window w1, for example. Note that application error among the options OP illustrated in FIG. 7 is an option indicating that the application executed has not met expectations. Furthermore, execution parameter error is an option indicating that, as per the example illustrated in FIG. 7, the parameters such as place and time which the application should refer to are erroneous.

As described hereinabove, the information processing server 20 according to the present embodiment makes it possible to efficiently gather and store cases pertaining to behavior of low validity. Note that the gathering method described using FIGS. 6 and 7 is merely an example, and that the case gathering method according to the present embodiment is not limited to or by such an example.

The cases according to the present embodiment may, for example, be gathered on the basis of an analysis, by the inventor or the like, of the operation history of the information processing terminal 10.

Furthermore, the output control unit 220 according to the present embodiment is capable of determining low reliability of behavior and of performing case gathering in the following cases, for example, in addition to the example illustrated in FIG. 6.

For example, if a speech recognition score is low due to the effect of noise or the like, errors with recognized content are likely, and the intention of the user will likely not be taken into account. For this reason, if a score for speech recognition by the recognition unit 210 is low, the output control unit 220 may determine that the reliability of behavior is low.

In addition, if an input by the user is vague, the output control unit 220 may not be able to narrow down the application which should be started. At such time, the output control unit 220 may also seek direction from the user by asking "Which application would you like to open?" but may start an application with a higher score. For this reason, if the application to be started cannot be specified, the output control unit 220 may determine that the reliability of behavior is low.

<<2.6. Reproduced Scene Output Control>>

The reproduced scene output control performed by the output control unit 220 according to the present embodiment will be described in detail next. As described earlier, a reproduced scene can be generated on the basis of various cases gathered in the present embodiment and the information processing terminal 10 can be made to output the playback scene. At such time, one feature of the output control unit 220 according to the present embodiment is to generate reproduced scenes which reflect context information which has been used in executing behaviors.

Note that context information according to the present embodiment includes information relating to user actions including input actions and utterances, and states and attributes, or peripheral environment states, and the like. In addition, the context information includes chronological information pertaining to interactions between the information processing terminal 10 and the user, and the like, as mentioned earlier.

The output control unit 220 according to the present embodiment is capable of generating reproduced scenes of speech interactions including utterances by a user and speech utterances by an information processing terminal, for example, by reflecting chronological information and other context information.

Moreover, the output control unit 220 according to the present embodiment may provide a judge with a generated reproduced scene and a user interface for configuring whether or not context information for the reproduced scenes is to be reflected.

Figure 8:
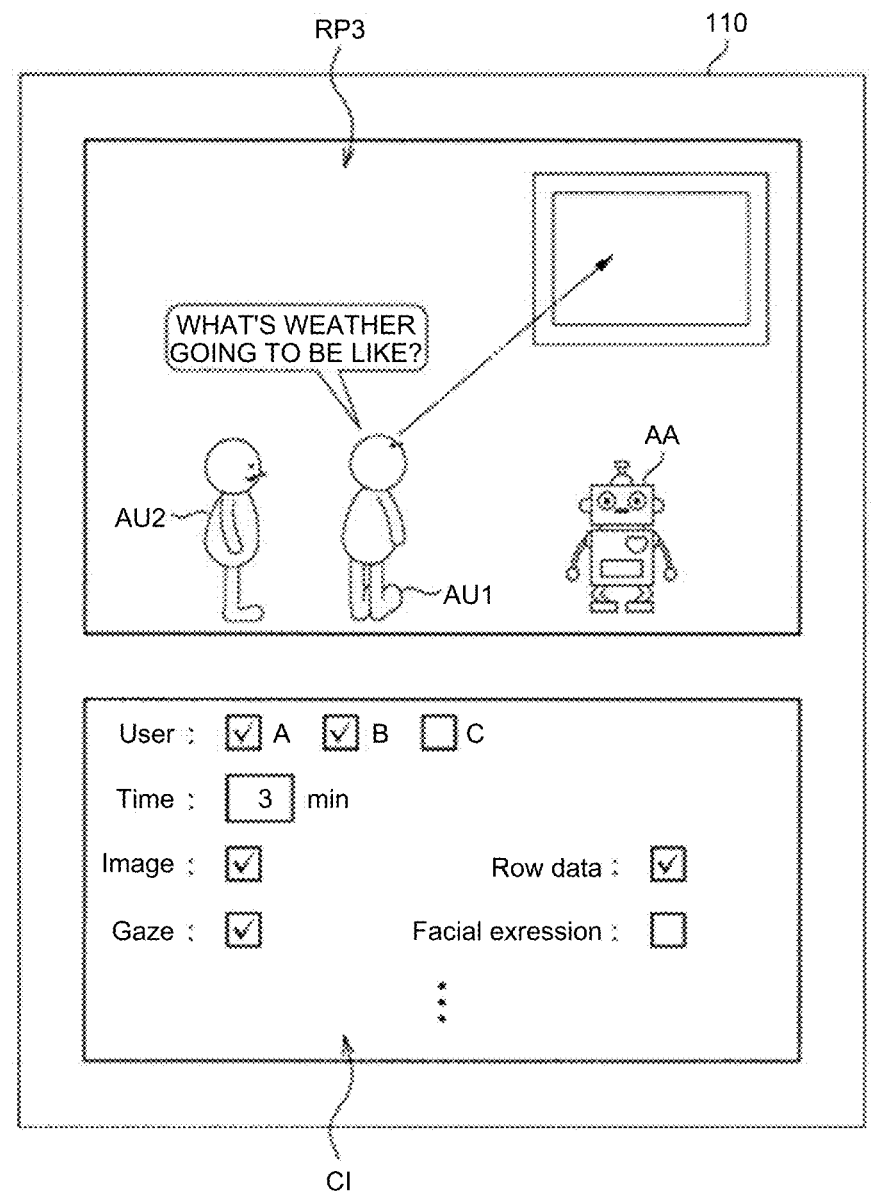
FIG. 8 is a diagram serving to illustrate a reproduced scene and a user interface for configuring whether or not context information is reflected, according to the same embodiment.

FIG. 8 is a diagram serving to illustrate a reproduced scene and a user interface for configuring whether or not context information is to be reflected, according to the present embodiment. FIG. 8 illustrates a reproduced scene RP3 which is displayed on the display unit 110 of the information processing terminal 10, and a user interface CI for configuring whether or not context information is to be reflected.

At such time, the judge viewing the reproduced scene RP3 is able to toggle whether and to what extent context information corresponding to each item included in the user interface CI is reflected in the reproduced scene RP3 by manipulating each item, and so forth.

For example, the judge is able to configure the users (user avatars AU) to be reflected in reproduced scene RP3. The judge may also be able to configure the number of users participating in an interaction, and the like. For example, when there are a plurality of users participating in the interaction, a situation where correct behavior cannot be specified only in an interaction between a user A and an information processing terminal 10 is also to be expected.

For example, there is also a likelihood that the context for specifying correct behavior is a previously conducted interaction between a user B and the information processing terminal 10. At such time, the judge is capable of determining correct behavior and providing feedback by reflecting, in the reproduced scene RP3, speech utterances which have been output to user B by the information processing terminal 10 and utterances made by user B. Note that, in the example illustrated in FIG. 8, the output control unit 220 reflects user avatars AU and AU2, which correspond to user A and user B, in the reproduced scene RP3 on the basis of conditions configured via user interface CI.

Furthermore, for example, the judge is able to designate the length of the reproduced scene RP3. As mentioned earlier, a situation often arises where chronological information such as a previous interaction serves as the context in an interaction. For this reason, the judge is capable of determining correct behavior and providing feedback by adjusting the length of the reproduced scene RP3.

Furthermore, for example, the judge may be able to configure the presence or absence of image information pertaining to the reproduced scene RP3. If the interaction between a user and the information processing terminal 10 is a speech interaction, the reproduced scene RP3 need not necessarily be accompanied by image information, and may instead be reproduced only by means of speech and text information. Hence, for example, in reproduced scene RP3 in which only speech is first played back, the judge can also cause visual information to be output only if correct behavior cannot be determined.

In addition, for example, cases where context which is impossible for the output control unit 220 to reproduce exists in the reproduced scene RP3 are also to be expected. Hence, the judge is also able to play back actual recorded speech or recorded images as reproduced scene RP3. Here, the judge is also able to discover context that has not been reproduced in the reproduced scene RP3 and provide feedback.

Furthermore, for example, the judge may be able to configure whether or not context relating to states such as the gaze and facial expressions of a user is reflected. Such user states can serve as context for specifying correct behavior by the information processing terminal 10. In the example illustrated in FIG. 8, the output control unit 220 reflects the gaze of the user avatar AU corresponding to user A in reproduced scene RP3, on the basis of conditions configured via the user interface CI.

As described hereinabove, the output control unit 220 according to the present embodiment may provide a judge with a reproduced scene and a user interface for configuring whether or not and to what extent the context information is to be reflected. By means of the foregoing functions of the output control unit 220 according to the present embodiment, the judge is able to adjust, as appropriate, the amount of information pertaining to the reproduced scene or is able to specify an embedded context.

Note that the reproduced scenes and context information according to the present embodiment are not limited to or by the foregoing examples described using FIG. 8. The output control unit 220 according to the present embodiment is also capable of generating reproduced scenes from the line of sight of the information processing terminal 10, for example.

Here, the judge is able to acquire minute variations in the facial expression of the user, and the like, as context.

Furthermore, context information pertaining to the present embodiment may include, for example, a user schedule, or the like. For example, sometimes a user schedule before and after an interaction between the user and the information processing terminal 10 can serve as context for specifying the correct context. Hence, the output control unit 220 may generate a reproduced scene in which a user schedule acquired from a scheduler or the like is reflected and may present the reproduced scene to the judge.

Moreover, the output control unit 220 according to the present embodiment may first present the reproduced scene thus generated to the judge in a state where the context information to be reflected has been narrowed down to a certain extent. Here, the judge is able to specify context information which has been supplemented to specify correct behavior.

On the other hand, the output control unit 220 according to the present embodiment may present a reproduced scene to the judge in a state where all of the context information which can be reflected has been reflected. Here, the judge is able to specify that excluded context information has not been used in specifying correct behavior.

Note that the judge viewing the reproduced scene is able to select prepared options and input feedback relating to correct behavior by making an utterance or by freely making inputs via a keyboard operation, or the like, for example. At such time, the reflection unit 240 according to the present embodiment stores correct answer labels generated from the feedback and context information which has been used to configure the user interface CI upon submitting the feedback, that is, to specify correct behavior, in the labeled behavior DB 256 in association with each other.

The generation, by the output control unit 220, of a reproduced scene obtained by processing context information will be described next. One feature of the information processing method according to the present embodiment is to present a reproduced scene pertaining to a stored case to a judge selected on the basis of conditions, and to obtain feedback. The user and judge are therefore often not the same person in the present embodiment.

At such time, when context information relating to content input by the user, user states and attributes, and so forth is used in a reproduced scene as is, it is also conceivable that the personal information of the user will likely be relayed to the judge.

Furthermore, even if the input content does not relate to personal information, when the attributes of the user and judge differ, versatile usage may be difficult. Note that, as the foregoing attributes, the gender, age, cultural background, location, and knowledge level of the user, and so forth, for example, are assumed.

Thus, when the user and judge differ, the output control unit 220 according to the present embodiment may generate and provide the judge with a reproduced scene obtained by processing a portion of the context information. At such time, the output control unit is capable of generating a reproduced scene obtained by converting a portion of the context information to different content with the same granularity.

Figure 9:
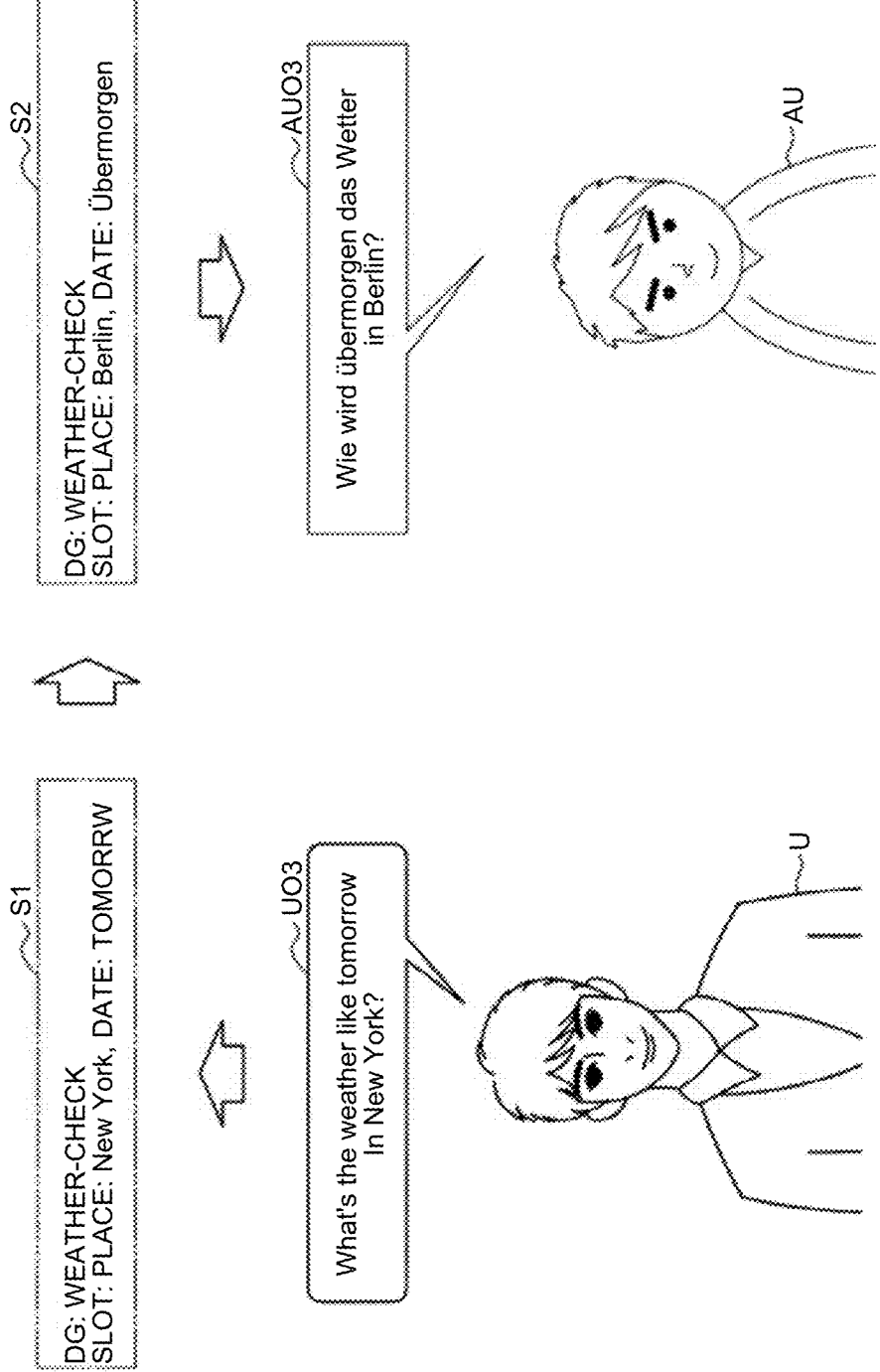
FIG. 9 is a diagram serving to illustrate processing of context information by the output control unit according to the same embodiment.

FIG. 9 is a diagram serving to illustrate processing of context information by the output control unit 220 according to the same embodiment. An utterance UO3 made by the user U is illustrated in the lower left corner of FIG. 9. Here, utterance UO3 may be an inquiry relating to the weather in New York tomorrow.

At such time, the recognition unit 210 according to the present embodiment generates an utterance intent symbol on the basis of information pertaining to utterance UO3 which has been gathered by the information processing terminal 10. In the top left corner of FIG. 9, a symbol S1 corresponding to utterance UO3, obtained through the symbol generation by the recognition unit 210, is displayed. Here, in symbol S1, the domain of utterance UO3 may be defined as a weather information request, and the place and date, which are the slots (parameters) pertaining to the request, may be defined as New York and tomorrow, respectively.

At such time, the output control unit 220 according to the present embodiment is capable of converting the slots for the place and date, or the like, for example, to different content with the same granularity. In the example illustrated in FIG. 9, the output control unit 220 generates a symbol S2 obtained by changing the place to Berlin and the date to the day after tomorrow, respectively.

Thereafter, the output control unit 220 generates speech utterance AO3, which is uttered by the user avatar AU corresponding to user U, on the basis of the symbol S2 thus generated. Note that in the example illustrated in FIG. 9, the output control unit 220 generates speech utterance AO3 by using language that corresponds to the place information modified by means of symbol S2. The output control unit 220 according to the present embodiment may thus process language, word order, and so forth, in addition to slots. Further, the output control unit 220 is also capable of generating speech utterance AO3 which is obtained by deleting a portion of utterance UO3 and adding new content.

Moreover, the output control unit 220 according to the present embodiment may also generate a user avatar AU which is obtained by changing a portion of the attributes and so forth pertaining to user U. For example, if user U is a male in his late twenties living alone with his wife and only daughter, the output control unit 220 may change the configuration of the user avatar AU to a male in his early thirties living alone with his wife and two daughters. Note that the output control unit 220 is capable of incorporating the foregoing user context in a reproduced scene by means of text information, for example.

As described hereinabove, the output control unit 220 according to the present embodiment is capable of generating a reproduced scene which is obtained by converting a portion of the context information to different content with the same granularity. According to the foregoing functions of the output control unit 220 according to the present embodiment, it is possible to protect the personal information of the user and modify a case to more versatile content, and so forth.

<<2.7. Judge Selection>>

Judge selection according to the present embodiment will be described next. The output control unit 220 according to the present embodiment is capable of selecting a judge who is to provide reproduced scenes on the basis of various conditions.

Typically, the act of inputting feedback on products places a heavy burden on the user, and therefore in order to gather feedback efficiently, the selection of a user with a high degree of motivation to provide feedback is important.

For this reason, the output control unit 220 according to the present embodiment may select a judge for requesting feedback on the basis of a user score pertaining to the feedback. Here, the user score may be an indicator of a high degree of user motivation to input feedback.

The user score may be calculated on the basis of actual results of inputting feedback in the past or actual results when consent for feedback has been granted, for example. Furthermore, the user score may be calculated as high for users with a strong, childlike curiosity and for long-time users of the system.

Furthermore, the user score may be calculated dynamically. The user score may be calculated as high immediately after a user interaction or when the content of the interaction is close to a case that has been stored, for example. The user score may also be calculated as high if a user has no immediate plans or is in a relaxed state.

Furthermore, the user score according to the present embodiment may be calculated on the basis of user attributes. The user score according to the present embodiment may be calculated as increasingly high as user attributes approach the attributes of the user, for example. Here, the output control unit 220 is capable of selecting a judge assumed to have tendencies similar to the user, thereby enabling more accurate feedback to be gathered.

Moreover, the user score according to the present embodiment may be calculated as increasingly high as user attributes approach character settings of the information processing terminal 10. In interactive devices of recent years, there has also been very little configuration of gender, age, and accuracy, and so forth, for characters performing interactions. For this reason, the output control unit 220 according to the present embodiment makes it possible to gather more accurate feedback regarding behaviors executed by the information processing terminal 10 by selecting a judge assumed to have tendencies similar to these characters.

<<2.8. Process Flow>>

Figure 10:
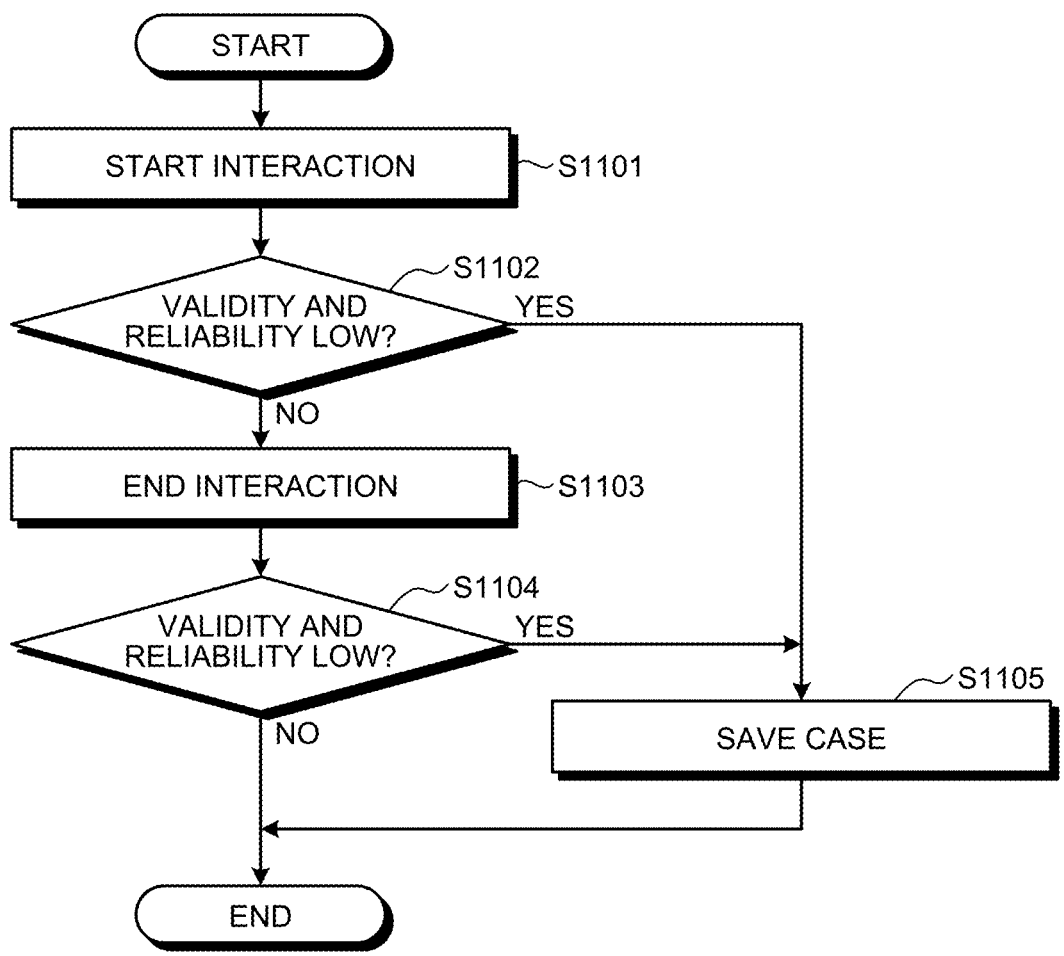
FIG. 10 is a flowchart illustrating the flow of case gathering by an information processing server according to the same embodiment.

The flow of processing by the information processing server 20 according to the present embodiment will be described in detail next. First, the flow of case gathering by the information processing server 20 will be described. FIG. 10 is a flowchart illustrating the flow of case gathering by the information processing server 20 according to the present embodiment.

Referring to FIG. 10, an interaction between the user and the information processing terminal 10 is first started on the basis of control by the output control unit 220 (S1101).

After the interaction has started in Step S1101, the output control unit 220 continuously checks the validity and reliability of speech utterances which are output by the information processing terminal 10 (S1102). In so doing, the output control unit 220 may perform the check on the basis of the content of user utterances, speech recognition results, and the like, as mentioned earlier. In addition, the output control unit 220 is also capable of determining validity on the basis of context such as the facial expression and actions of the user.

Here, if the validity and reliability are below a threshold (S1102: YES), the output control unit 220 stores behaviors and context information in the case DB 254 in association with each other (S1105).

On the other hand, if the validity and reliability are not below the threshold (S1102: NO), the output control unit 220 ends the interaction by means of the information processing terminal 10 (S1103).

Furthermore, after the interaction has ended in Step S1103, the output control unit 220 may check the validity and reliability of behavior once again (S1104).

Here, if a behavior whose validity and reliability are below the threshold has been detected (S1102: YES), the output control unit 220 moves to Step S1105 and stores behaviors and context information in the case DB 254 in association with each other.

The flow of case gathering by the information processing server 20 according to the present embodiment has been described hereinabove. Note that, in the description using FIG. 10, gathering of cases by the information processing server 20 in real time during interactions has been described by way of example. Meanwhile, as mentioned earlier, the information processing server according to the present embodiment also enables cases to be stored on the basis of explicit inputs by the user and the results of analysis by developers or the like.

The flow of reproduced scene output control and feedback gathering by the information processing server 20 according to the present embodiment will be described next. FIG. 11 is a flowchart illustrating the flow of reproduced scene output control and feedback gathering by the information processing server 20 according to the present embodiment.

Referring to FIG. 11, the output control unit 220 first selects a case for performing reproduction (S1201). At such time, the output control unit 220 may select a case obtained by a user making an input explicitly or a case pertaining to a longer interaction. Furthermore, the output control unit 220 may select a case relating to a more commonly used application or an application for which many cases have been stored, for example.

Thereafter, the output control unit 220 selects a judge for requesting feedback, on the basis of a user score (S1202).

The output control unit 220 then performs processing of context information on the basis of the case selected in Step S1201 and information on the judge selected in Step S1202 (S1203).

The output control unit 220 then generates a reproduced scene on the basis of the context information processed in Step S1203 and causes the information processing terminal 10 to output the reproduced scene (1204).

Here, if there is feedback from a judge regarding the reproduced scene output in Step S1204 (S1205: YES), the reflection unit 240 generates a correct answer label from the feedback and stores same in the labeled behavior DB 256 together with the context information.

Furthermore, the reflection unit 240 updates the user score pertaining to the judge on the basis of the presence or absence of feedback in Step S1205 (S1206).

3. Second Embodiment

A second embodiment according to the present embodiment will be described next. In a second embodiment according to the present embodiment, an example where the information processing terminal 10 has a function for performing music playback, based on the preferences and states of a user, on the basis of control by means of the information processing server 20 will be described.

Note that the description hereinbelow will be centered on the differences from the first embodiment, and that detailed descriptions of functions and features in common with the first embodiment will be omitted.

Figure 12A:
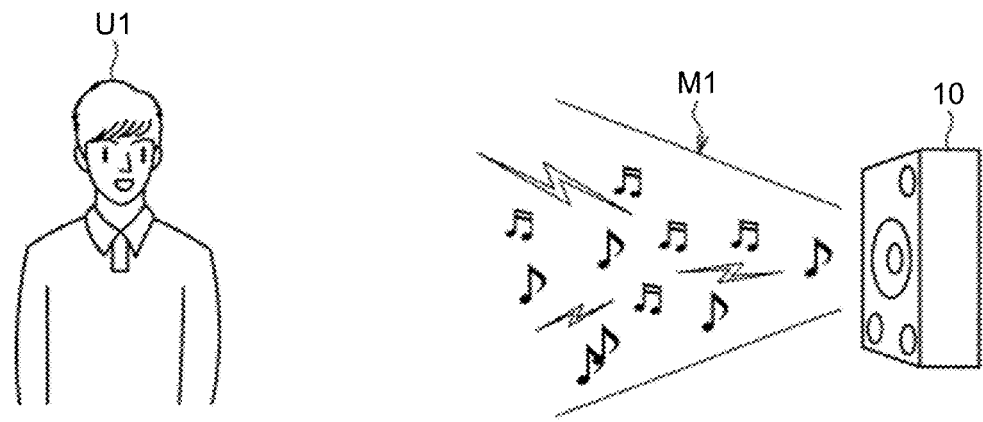
FIG. 12A is a diagram serving to illustrate behavior of an information processing terminal according to a second embodiment of the present invention.
Figure 12B:
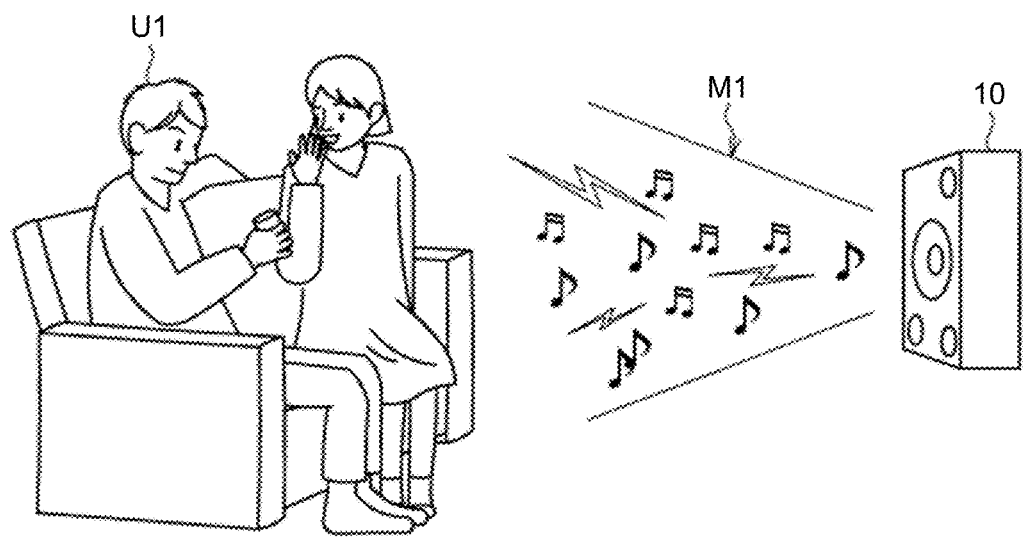
FIG. 12B is a diagram serving to illustrate the behavior of the information processing terminal according to the same embodiment.

FIGS. 12A and 12B are diagrams serving to illustrate behavior of an information processing terminal 10 according to the second embodiment. As mentioned above, the information processing terminal 10 according to the present embodiment has a function for performing music playback, based on the preferences and states of a user, on the basis of control by means of the information processing server 20. The output control unit 220 according to the present embodiment is capable of determining, and causing the information processing terminal 10 to output, the music which is to be played back on the basis of information on the user stored in the user DB 252 and states of the user recognized by the recognition unit 210, and the like, for example.

FIG. 12A illustrates an example where the output control unit 220 causes the information processing terminal 10 to output music M1 on the basis of user preferences stored in the user DB 252. The output control unit 220 is capable of outputting music M1 on the basis of the recognition unit 210 detecting a user U1 close to the information processing terminal 10, for example. Here, music M1 may be a piece of music with a lively tempo such as rock, for example.

Meanwhile, FIG. 12B illustrates an example where the output control unit 220 causes the information processing terminal 10 to execute music playback when the user is relaxing with another person. In the example illustrated in FIG. 12B, the output control unit 220 outputs music M1 on the basis of the preferences of user U1, similarly to the case illustrated in FIG. 12A.

However, in the example illustrated in FIG. 12B, user U1 actually desires music with a calm tempo so that they can enjoy being with the other person. In other words, the example illustrated in FIG. 12B illustrates a case where the information processing terminal 10 is executing a low validity behavior.

At such time, the output control unit 220 according to the present embodiment determines that the validity of the behavior executed by the information processing terminal 10 is low on the basis of recognized facial expressions and utterances, and so forth, of user U1 and stores the behavior and context information in the case DB 254 in association with each other, for example. Note that, in the example illustrated in FIG. 12B, the context information includes the presence of another person, the relaxed state of user U1, or an action of user U1 such as having a meal.

Furthermore, the output control unit 220 is capable of generating a reproduced scene pertaining to a case and requesting feedback from a judge, similarly to the first embodiment, after case gathering. By means of the foregoing functions of the output control unit 220 according to the present embodiment, it is possible to efficiently gather feedback regarding behaviors of the information processing terminal 10 on the basis of context information such as user states and peripheral environment states.

4. Third Embodiment

A third embodiment according to the present embodiment will be described next. In the third embodiment according to the present embodiment, an example where the information processing terminal 10 implements a virtual object display on the basis of control by the information processing server 20 is described.

Note that the description hereinbelow will be centered on the differences from the first and second embodiments, and that detailed descriptions of functions and features in common with the first and second embodiments will be omitted.

Figure 13:
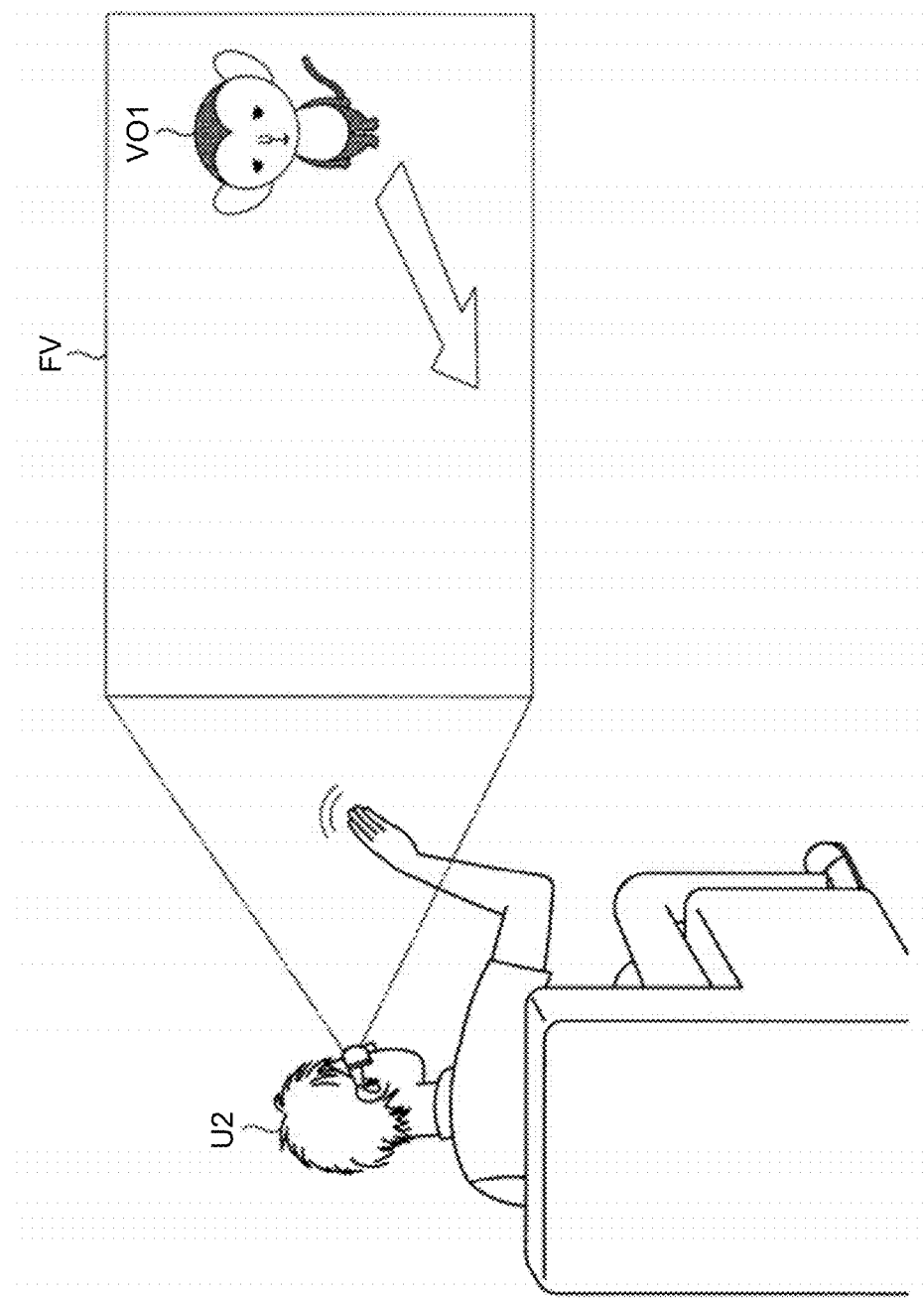
FIG. 13 is a diagram serving to illustrate the operation of an information processing terminal according to a third embodiment of the present invention.

FIG. 13 is a diagram serving to illustrate the operation of an information processing terminal 10 according to a third embodiment. As mentioned earlier, the information processing terminal 10 according to the present embodiment has a function for implementing a virtual object display on the basis of control by the information processing server 20. The information processing terminal 10 displays a virtual object VO1 in the field of view FV of user U2 by using augmented reality (AR) technology and virtual reality (VR) technology, and the like, for example.

At such time, the output control unit 220 according to the present embodiment may control the behavior of virtual object VO1 on the basis of gestures and the like of user U2, for example. In the example illustrated in FIG. 13, the output control unit 220 exercises control so that virtual object VO1 approaches in the direction of user U2 on the basis of a gesture by user U2, in moving a wrist or finger joint to move the palm of their hand downward, which is recognized by the recognition unit 210.

However, in the example illustrated in FIG. 13, due to the cultural background of user U2, the foregoing gesture is an action indicating that an object is to be shifted to a position separate from user U2, whereas user U2 actually wants the virtual object VO1 to be far away from them. In other words, the example illustrated in FIG. 13 illustrates a case where the information processing terminal 10 is executing a low validity behavior.

At such time, the output control unit 220 according to the present embodiment determines that the validity of the behavior executed by the information processing terminal 10 is low on the basis of recognized facial expressions and utterances, and so forth, of user U1 and stores the behavior and context information in the case DB 254 in association with each other, for example. Note that, in the example illustrated in FIG. 13, the context information includes gestures by user U2 and information on the cultural background of user U2, and the like.

Furthermore, the output control unit 220 is capable of generating a reproduced scene pertaining to a case and requesting feedback from a judge, similarly to the first and second embodiments, after case gathering. At such time, the output control unit 220 according to the present embodiment may select, as a judge, a user having a cultural background which is the same as or similar to a user U3. By means of the foregoing functions of the output control unit 220 according to the present embodiment, it is possible to efficiently gather feedback regarding behaviors of the information processing terminal 10 on the basis of context information such as user actions and attributes.

5. Hardware Configuration Example

Figure 14:
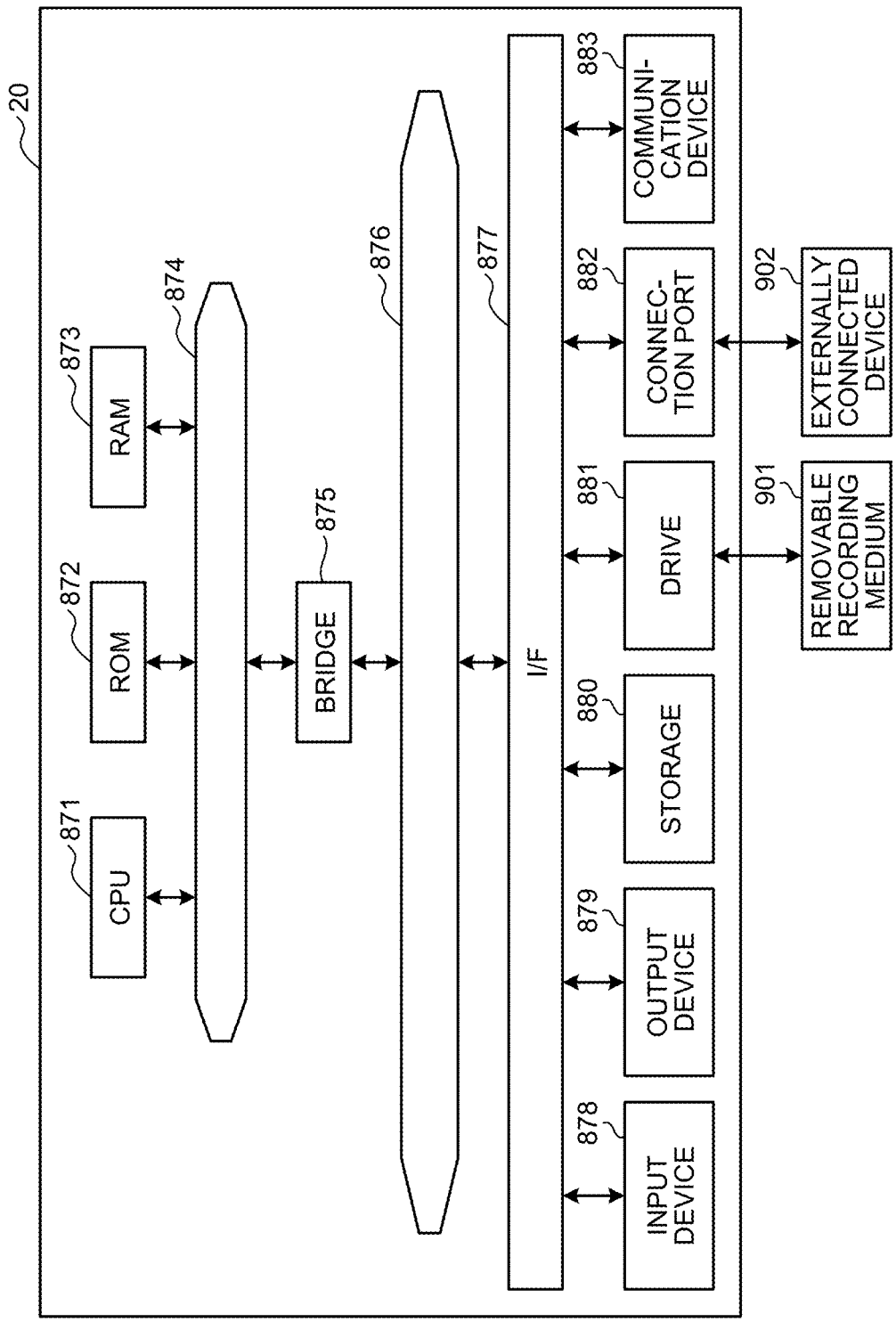
FIG. 14 is a diagram illustrating a hardware configuration example according to one embodiment of the present invention.

A hardware configuration example which is common to the information processing terminal 10 and information processing server 20 according to one embodiment of the present invention will be described next. FIG. 14 is a block diagram illustrating a hardware configuration example of the information processing terminal 10 and information processing server 20 according to one embodiment of the present invention. Referring to FIG. 14, the information processing terminal 10 and information processing server 20 comprises, for example, a CPU 871, a ROM 872, a RAM 873, a host bus 874, a bridge 875, an external bus 876, an interface 877, an input device 878, an output device 879, storage 880, a drive 881, a connection port 882, and a communication device 883. Note that, here, the hardware configuration is an example, and a portion of the constituent elements may be omitted. Furthermore, constituent elements other than the constituent elements illustrated here may also be included.

(CPU871)

The CPU 871 functions as an arithmetic processing unit or control device, for example, and controls all or some of the operations of constituent elements on the basis of various programs which are recorded on the ROM 872, RAM 873, storage 880, or a removable recording medium 901.

(ROM872, RAM873)

The ROM 872 is means for storing programs which are read by the CPU 871, data which is used in arithmetic processing, and the like. The RAM 873 temporarily or permanently stores the programs which are read by the CPU 871 and various parameters and so forth which suitably change in executing these programs, for example.

(Host Bus 874, Bridge 875, External Bus 876, and Interface 877)

The CPU 871, ROM 872, and RAM 873 are interconnected via host bus 874 which enables high-speed data transmissions, for example. Meanwhile, the host bus 874 is connected to the external bus 876, which has a relatively low data transmission speed, via the bridge 875, for example. In addition, the external bus 876 is connected to various constituent elements via the interface 877.

(Input Device 878)

A mouse, keyboard, touch panel, button, switch, or lever, or the like, is used as the input device 878, for example. Furthermore, a remote controller which enables a control signal to be transmitted by using infrared or other radio waves is sometimes used as the input device 878. In addition, the input device 878 includes a speech input device such as a microphone.

(Output Device 879)

The output device 879 is, for example, a device which enables acquired information to be communicated visually or auditorily to a user, for instance a display device such as a cathode ray tube (CRT), LCD, or organic EL display, an audio output device such as a loudspeaker or headphones, or a printer, portable telephone, or facsimile machine. Moreover, the output device 879 according to the present invention includes various vibration devices enabling the output of tactile stimulation.

(Storage 880)

The storage 880 is a device for storing various data. As the storage 880, a magnetic storage device such as a hard disk drive (HDD), a semiconductor storage device, an optical storage device, or a magneto-optical storage device, or the like, is used, for example.

(Drive 881)

The drive 881 is, for example, a device that reads information recorded on the removable recording medium 901 such as a magnetic disk, optical disk, magneto-optical disk, or semiconductor memory, or which writes information to the removable recording medium 901.

(Removable Recording Medium 901)

The removable recording medium 901 is, for example, DVD media, Blu-ray (registered trademark) media, an HD DVD media, or various semiconductor storage media, or the like. Naturally, the removable recording medium 901 may, for example, be a non-contact-type IC card with a built-in IC chip, or an electronic device, or the like.

(Connection Port 882)

The connection port 882 is, for example, a port for connecting an externally connected device 902 like a Universal Serial Bus (USB) port, an IEEE1394 port, a small computer system interface (SCSI), an RS-232C port, or an optical audio terminal, or the like.

(Externally Connected Device 902)

The externally connected device 902 is, for example, a printer, a portable music player, a digital camera, a digital video camera, or an IC recorder, or the like.

(Communication Device 883)

The communication device 883 is a communication device for connecting to a network such as, for example, a wired or wireless LAN, Bluetooth (registered trademark) or wireless USB (WUSB) communication card, an optical communication router, an asymmetric digital subscriber line (ADSL) router, or various cellular modems.

6. Conclusion

As described hereinabove, the information processing server 20 according to one embodiment of the present invention is capable of generating, on the basis of gathered cases, a reproduced scene pertaining to behaviors executed by the information processing terminal 10 on the basis of context information, and of controlling the output of the reproduced scenes. In addition, the information processing server 20 according to one embodiment of the present invention is capable of receiving and saving feedback which is input by the judge regarding the reproduced scene thus output. According to this configuration, it is possible to gather more effective information for the correction of device behavior.

Preferred embodiments of the present invention have been described in detail hereinabove with reference to the accompanying drawings, but the technical scope of the present invention is not limited to or by such an example. It is obvious that a person with normal knowledge in the technical field of the present invention could arrive at various modification examples or revised examples within the scope of the technological ideas disclosed in the claims, and it is naturally understood that such examples belong to the technical scope of the present invention.

Furthermore, the advantageous effects disclosed in the present specification are only descriptive or exemplary, and non-limiting. In other words, the technology according to the present invention affords, in addition to or instead of the foregoing advantageous effects, other advantageous effects which are obvious, from the disclosure of the present specification, to a person skilled in the art.

Moreover, each of the steps pertaining to the processing by the information processing server 20 of the present specification need not necessarily be processed in chronological order as per the order described in the flowchart. For example, each of the steps pertaining to the processing by the information processing server 20 may be processed in a different order from the order described in the flowchart or may be processed in parallel.

Note that the following configurations also fall within the technical scope of the present invention.

(1)

An information processing device, comprising:

an output control unit that controls, on the basis of a gathered operation history of a device, an output of a reproduced scene pertaining to a behavior which the device has executed on the basis of context information; and a communication unit that receives feedback input by a judge regarding the reproduced scene thus output.

(2)

The information processing device according to (1), wherein the output control unit controls the output of the reproduced scene in which the context information is reflected.

(3)

The information processing device according to (1) or (2), wherein the operation history includes a history relating to behaviors by the device for which validity has been determined as low.

(4)

The information processing device according to any one of (1) to (3), wherein the operation history includes a history relating to behaviors which the device has executed with low reliability.

(5)
The information processing device according to any one of (1) to (4),
wherein the output control unit controls an output, of the reproduced scene, which includes a behavior of the device and a behavior of a user of the device.

(6)
The information processing device according to any one of (1) to (5),
wherein the output control unit provides the judge with an interface for configuring whether or not and to what extent the context information for the reproduced scene is reflected.

(7)
The information processing device according to (6),
wherein the output control unit gathers, together with the feedback, information pertaining to whether or not and to what extent the context information configured via the interface is reflected.

(8)
The information processing device according to any one of (1) to (7),
wherein the context information includes at least user context-related information pertaining to a user for the behavior executed by the device.

(9)
The information processing device according to (8),
wherein the user context includes at least any of an action, state, or attribute of the user.

(10)
The information processing device according to (9),
wherein the output control unit controls the output of the reproduced scene in which the user context has been reproduced.

(11)
The information processing device according to any one of (1) to (10),
wherein the operation history is a history relating to an interaction between the device and the user of the device, and
wherein the output control unit controls the output of the reproduced scene pertaining to the interaction.

(12)
The information processing device according to any of (11),
wherein the context information includes chronological information pertaining to the interaction, and
wherein the output control unit controls the output of the reproduced scene in which the chronological information is reflected.

(13)
The information processing device according to (11) or (12),
wherein the interaction is a speech interaction including utterances by the user and speech utterances by the device.

(14)
The information processing device according to any one of (1) to (13),
wherein the output control unit outputs the reproduced scene obtained by converting the behavior by the device or at least a portion of the context information to different content with the same granularity.

(15)
The information processing device according to any one of (1) to (14),
wherein the operation history is a history relating to an interaction between the device and the user of the device, and
wherein, if the user and the judge differ, the output control unit outputs the reproduced scene which is obtained by converting a portion of the interaction to different content of the same granularity.

(16)
The information processing device according to any one of (1) to (15),
wherein the output control unit outputs the reproduced scene to a terminal used by the judge who has been selected on the basis of a user attribute.

(17)
The information processing device according to any one of (1) to (16),
wherein the output control unit determines the validity or reliability of the behavior by the device.

(18)
An information processing device, comprising:
a communication unit that receives information on a reproduced scene pertaining to a behavior which the device has executed on the basis of context information; and
a playback unit that plays back the reproduced scene,
wherein the communication unit transmits feedback input by a judge regarding the reproduced scene.

(19)
An information processing method executed by a processor, comprising:
controlling, on the basis of a gathered operation history of a device, an output of a reproduced scene pertaining to a behavior which the device has executed on the basis of context information; and
receiving feedback input by a judge regarding the reproduced scene thus output.

(20)
An information processing method executed by a processor, comprising:
receiving information on a reproduced scene pertaining to a behavior which a device has executed on the basis of context information;
playing back the reproduced scene; and
transmitting feedback input by a judge regarding the reproduced scene.

REFERENCE SIGNS LIST

10 INFORMATION PROCESSING TERMINAL
110 DISPLAY UNIT
120 SPEECH OUTPUT UNIT
130 INPUT UNIT
140 IMAGING UNIT
150 SENSOR UNIT
160 CONTROL UNIT
170 SERVER COMMUNICATION UNIT
20 INFORMATION PROCESSING SERVER
210 RECOGNITION UNIT
220 OUTPUT CONTROL UNIT
230 SPEECH SYNTHESIS UNIT
240 REFLECTION UNIT
250 STORAGE UNIT
252 USER DB
254 CASE DB
256 LABELED BEHAVIOR DB
260 TERMINAL COMMUNICATION UNIT

The invention claimed is:
1. An information processing device, comprising:
output control circuitry configured to control, based on a gathered operation history of a device, an output of a reproduced scene pertaining to a behavior which the device has executed based on context information; and communication circuitry configured to feedback input by a judge regarding the reproduced scene thus output, wherein the output control circuitry is configured to provide the judge with an interface for configuring whether or not and to what extent the context information for the reproduced scene is reflected.

2. The information processing device according to claim 1, wherein the output control circuitry is configured to control the output of the reproduced scene in which the context information is reflected.

3. The information processing device according to claim 1, wherein the operation history includes a history relating to behaviors by the device for which validity has been determined as low.

4. The information processing device according to claim 1, wherein the operation history includes a history relating to behaviors which the device has executed with low reliability.

5. The information processing device according to claim 1, wherein the output control circuitry is configured to control an output, of the reproduced scene, which includes a behavior of the device and a behavior of a user of the device.

6. The information processing device according to claim 1, wherein the output control circuitry is configured to gather, together with the feedback, information pertaining to whether or not and to what extent the context information configured via the interface is reflected.

7. The information processing device according to claim 1, wherein the context information includes at least user context-related information pertaining to a user for the behavior executed by the device.

8. The information processing device according to claim 7, wherein the user context includes at least any of an action, state, or attribute of the user.

9. The information processing device according to claim 8, wherein the output control circuitry is configured to control the output of the reproduced scene in which the user context has been reproduced.

10. The information processing device according to claim 1, wherein the operation history is a history relating to an interaction between the device and the user of the device, and wherein the output control circuitry is configured to control the output of the reproduced scene pertaining to the interaction.

11. The information processing device according to any of claim 10, wherein the context information includes chronological information pertaining to the interaction, and wherein the output control circuitry is configured to control the output of the reproduced scene in which the chronological information is reflected.

12. The information processing device according to claim 10, and speech utterances by the device.

13. The information processing device according to claim 1, wherein the output control circuitry is configured to output the reproduced scene obtained by converting the behavior by the device or at least a portion of the context information to different content with the same granularity.

14. The information processing device according to claim 1, wherein the operation history is a history relating to an interaction between the device and the user of the device, and wherein, if the user and the judge differ, the output control circuitry is configured to output the reproduced scene which is obtained by converting a portion of the interaction to different content of the same granularity.

15. The information processing device according to claim 1, wherein the output control circuitry is configured to output the reproduced scene to a terminal used by the judge who has been selected based on a user attribute.

16. The information processing device according to claim 1, wherein the output control circuitry is configured to determine the validity or reliability of the behavior by the device.

17. An information processing device, comprising:

communication circuitry configured to receive information on a reproduced scene pertaining to a behavior which the device has executed based on context information; and playback circuitry configured to play back the reproduced scene, wherein the communication circuitry is configured to transmit feedback input by a judge regarding the reproduced scene and to provide the judge with an interface for configuring whether or not and to what extent the context information for the reproduced scene is reflected.

18. An information processing method executed by a processor, comprising:

controlling, based on a gathered operation history of a device, an output of a reproduced scene pertaining to a behavior which the device has executed based on context information;

receiving feedback input by a judge regarding the reproduced scene thus output; and providing the judge with an interface for configuring whether or not and to what extent the context information for the reproduced scene is reflected.

19. An information processing method executed by a processor, comprising:

receiving information on a reproduced scene pertaining to a behavior which a device has executed based on context information;

playing back the reproduced scene;

transmitting feedback input by a judge regarding the reproduced scene; and providing the judge with an interface for configuring whether or not and to what extent the context information for the reproduced scene is reflected.

* * * * *